(12) United States Patent
Gilliam et al.

(10) Patent No.: US 7,685,642 B2
(45) Date of Patent: Mar. 23, 2010

(54) SYSTEM AND METHOD FOR CONTROLLING RIGHTS EXPRESSIONS BY STAKEHOLDERS OF AN ITEM

(75) Inventors: Charles P Gilliam, Darien, CT (US); Eddie J Chen, Rancho Palos Verdes, CA (US)

(73) Assignee: ContentGuard Holdings, Inc., Wilmington, DE (US)

( * ) Notice: Subject to any disclaimer, the term of this patent is extended or adjusted under 35 U.S.C. 154(b) by 1979 days.

(21) Appl. No.: 10/606,151

(22) Filed: Jun. 26, 2003

(65) Prior Publication Data

US 2004/0267552 A1 Dec. 30, 2004

(51) Int. Cl.
*H04L 9/32* (2006.01)
(52) U.S. Cl. .............................. 726/26; 726/27; 726/28
(58) Field of Classification Search ............. 726/26–30; 713/193; 705/51, 59; 380/200–202
See application file for complete search history.

(56) References Cited

U.S. PATENT DOCUMENTS

| | | | |
|---|---|---|---|
| 4,159,468 A | 6/1979 | Barnes et al. | |
| 4,200,700 A | 4/1980 | Mäder | |
| 4,361,851 A | 11/1982 | Asip et al. | |
| 4,423,287 A | 12/1983 | Zeidler | |
| 4,429,385 A | 1/1984 | Cichelli et al. | |
| 4,621,321 A | 11/1986 | Boebert et al. | |
| 4,736,422 A | 4/1988 | Mason | |
| 4,740,890 A | 4/1988 | William | |
| 4,796,220 A | 1/1989 | Wolfe | |
| 4,816,655 A | 3/1989 | Musyck et al. | |
| 4,888,638 A | 12/1989 | Bohn | |
| 4,937,863 A | 6/1990 | Robert et al. | |

(Continued)

FOREIGN PATENT DOCUMENTS

BR 9810967 A 10/2001

(Continued)

OTHER PUBLICATIONS

Blaze et al, "Divertible Protocols and Atomic Proxy Cryptography" 1998 Advances in Cryptography—Euro Crypt International Conference on the Theory and Application of Crypto Techniques, Springer Verlag, DE.

(Continued)

*Primary Examiner*—Hosuk Song
(74) *Attorney, Agent, or Firm*—Nixon Peabody, LLP; Marc S. Kaufman; Stephen M. Hertzler

(57) ABSTRACT

A system and method for controlling a rights expression specifying a manner of use of an item, including specifying by a provider of an item a rights expression indicating a manner of use of the item by a recipient of the item and a condition for use of the item by the recipient, the condition indicating that the use by the recipient of the item is subject to control; associating the rights expression with the item; and controlling the use by the recipient of the item based on the condition in the rights expression. In further exemplary embodiments, the use by the recipient of the item is subject to control by a stakeholder and/or a provider of the item and can be used to provide consumer protection based on parameters of use.

72 Claims, 7 Drawing Sheets

U.S. PATENT DOCUMENTS

| | | | |
|---|---|---|---|
| 4,953,209 A | 8/1990 | Ryder et al. |
| 4,977,594 A | 12/1990 | Shear |
| 5,014,234 A | 5/1991 | Edwards |
| 5,129,083 A | 7/1992 | Cutler et al. |
| 5,138,712 A | 8/1992 | Corbin |
| 5,174,641 A | 12/1992 | Lim |
| 5,204,897 A | 4/1993 | Wyman |
| 5,247,575 A | 9/1993 | Sprague et al. |
| 5,260,999 A | 11/1993 | Wyman |
| 5,276,444 A | 1/1994 | McNair |
| 5,287,408 A | 2/1994 | Samson |
| 5,291,596 A | 3/1994 | Mita |
| 5,293,422 A | 3/1994 | Loiacono |
| 5,335,275 A | 8/1994 | Millar et al. |
| 5,337,357 A | 8/1994 | Chou et al. |
| 5,386,369 A | 1/1995 | Christiano |
| 5,390,297 A | 2/1995 | Barber et al. |
| 5,414,852 A | 5/1995 | Kramer et al. |
| 5,438,508 A | 8/1995 | Wyman |
| 5,453,601 A | 9/1995 | Rosen |
| 5,485,577 A | 1/1996 | Eyer et al. |
| 5,504,816 A | 4/1996 | Hamilton et al. |
| 5,530,235 A | 6/1996 | Stefik et al. |
| 5,535,276 A | 7/1996 | Ganesan |
| 5,553,143 A | 9/1996 | Ross et al. |
| 5,557,678 A | 9/1996 | Ganesan |
| 5,564,038 A | 10/1996 | Grantz et al. |
| 5,619,570 A | 4/1997 | Tsutsui |
| 5,625,690 A | 4/1997 | Michel et al. |
| 5,629,980 A | 5/1997 | Stefik et al. |
| 5,634,012 A | 5/1997 | Stefik et al. |
| 5,636,346 A | 6/1997 | Saxe |
| 5,638,443 A | 6/1997 | Stefik et al. |
| 5,638,513 A | 6/1997 | Ananda |
| 5,708,709 A | 1/1998 | Rose |
| 5,715,403 A | 2/1998 | Stefik |
| 5,745,879 A | 4/1998 | Wyman |
| 5,764,807 A | 6/1998 | Pearlman et al. |
| 5,765,152 A | 6/1998 | Erickson |
| 5,787,172 A | 7/1998 | Arnold |
| 5,790,677 A | 8/1998 | Fox et al. |
| 5,812,664 A | 9/1998 | Bernobich et al. |
| 5,825,876 A | 10/1998 | Peterson |
| 5,825,879 A | 10/1998 | Davis |
| 5,838,792 A | 11/1998 | Ganesan |
| 5,848,154 A | 12/1998 | Nishio et al. |
| 5,848,378 A | 12/1998 | Shelton et al. |
| 5,850,443 A | 12/1998 | Van Oorschot et al. |
| 5,915,019 A | 6/1999 | Ginter et al. |
| 5,917,912 A | 6/1999 | Ginter et al. |
| 5,933,498 A | 8/1999 | Schneck et al. |
| 5,940,504 A | 8/1999 | Griswold |
| 5,982,891 A | 11/1999 | Ginter et al. |
| 5,987,134 A | 11/1999 | Shin et al. |
| 5,999,624 A | 12/1999 | Hopkins |
| 6,006,332 A | 12/1999 | Rabne et al. |
| 6,020,882 A | 2/2000 | Kinghorn et al. |
| 6,047,067 A | 4/2000 | Rosen |
| 6,073,234 A | 6/2000 | Kigo et al. |
| 6,091,777 A | 7/2000 | Guetz et al. |
| 6,112,239 A | 8/2000 | Kenner et al. |
| 6,135,646 A | 10/2000 | Kahn et al. |
| 6,141,754 A | 10/2000 | Choy |
| 6,157,719 A | 12/2000 | Wasilewski et al. |
| 6,169,976 B1 | 1/2001 | Colosso |
| 6,185,683 B1 | 2/2001 | Ginter et al. |
| 6,189,037 B1 | 2/2001 | Adams et al. |
| 6,189,146 B1 | 2/2001 | Misra et al. |
| 6,209,092 B1 | 3/2001 | Linnartz |
| 6,216,112 B1 | 4/2001 | Fuller et al. |
| 6,219,652 B1 | 4/2001 | Carter et al. |
| 6,233,674 B1 | 5/2001 | Elnozahy |
| 6,236,971 B1 | 5/2001 | Stefik et al. |
| 6,307,939 B1 | 10/2001 | Vigarie |
| 6,353,888 B1 | 3/2002 | Kakehi et al. |
| 6,397,333 B1 | 5/2002 | Söhne et al. |
| 6,401,211 B1 | 6/2002 | Brezak, Jr. et al. |
| 6,405,369 B1 | 6/2002 | Tsuria |
| 6,424,717 B1 | 7/2002 | Pinder et al. |
| 6,424,947 B1 | 7/2002 | Tsuria et al. |
| 6,487,659 B1 | 11/2002 | Kigo et al. |
| 6,516,052 B2 | 2/2003 | Voudouris |
| 6,516,413 B1 | 2/2003 | Aratani et al. |
| 6,523,745 B1 | 2/2003 | Tamori |
| 6,611,812 B2 | 8/2003 | Hurtado et al. |
| 6,690,794 B1 * | 2/2004 | Terao et al. .................. 380/22 |
| 6,796,555 B1 | 9/2004 | Blahut |
| 2001/0009026 A1 | 7/2001 | Terao et al. |
| 2001/0011276 A1 | 8/2001 | Durst, Jr. et al. |
| 2001/0014206 A1 | 8/2001 | Artigalas et al. |
| 2001/0037467 A1 | 11/2001 | O'Toole, Jr. et al. |
| 2001/0039659 A1 | 11/2001 | Simmons et al. |
| 2002/0001387 A1 | 1/2002 | Dillon |
| 2002/0035618 A1 | 3/2002 | Mendez et al. |
| 2002/0044658 A1 | 4/2002 | Wasilewski et al. |
| 2002/0056118 A1 | 5/2002 | Hunter et al. |
| 2002/0069282 A1 | 6/2002 | Reisman |
| 2002/0099948 A1 | 7/2002 | Kocher et al. |
| 2002/0127423 A1 | 9/2002 | Kayanakis |
| 2003/0097567 A1 | 5/2003 | Terao et al. |
| 2004/0052370 A1 | 3/2004 | Katznelson |
| 2004/0172552 A1 | 9/2004 | Boyles et al. |

FOREIGN PATENT DOCUMENTS

| | | |
|---|---|---|
| EP | 0 067 556 B1 | 12/1982 |
| EP | 0 257 585 A2 | 3/1988 |
| EP | 0 262 025 A2 | 3/1988 |
| EP | 0 332 304 A2 | 9/1989 |
| EP | 0 393 806 A2 | 10/1990 |
| EP | 0 450 841 A2 | 10/1991 |
| EP | 0 529 261 A2 | 3/1993 |
| EP | 0 613 073 A1 | 8/1994 |
| EP | 0 678 836 A1 | 10/1995 |
| EP | 0 679 977 A1 | 11/1995 |
| EP | 0 715 243 A1 | 6/1996 |
| EP | 0 715 244 A1 | 6/1996 |
| EP | 0 715 245 A1 | 6/1996 |
| EP | 0715247 A1 | 6/1996 |
| EP | 0 731 404 A1 | 9/1996 |
| EP | 0 763 936 A2 | 3/1997 |
| EP | 0 818 748 A2 | 1/1998 |
| EP | 0 840 194 A2 | 5/1998 |
| EP | 0 892 521 A2 | 1/1999 |
| EP | 0 934 765 A1 | 8/1999 |
| EP | 0 946 022 A2 | 9/1999 |
| EP | 0 964 572 A1 | 12/1999 |
| EP | 1 103 922 A2 | 5/2001 |
| GB | 1483282 | 8/1977 |
| GB | 2022969 A | 12/1979 |
| GB | 2236604 A | 4/1991 |
| GB | 2309364 A | 7/1997 |
| GB | 2316503 A | 2/1998 |
| GB | 2354102 A | 3/2001 |
| JP | 3-063717 A | 3/1991 |
| JP | 5-100939 | 4/1993 |
| JP | 5168039 A2 | 7/1993 |
| JP | 6-131371 A | 5/1994 |
| JP | 7-36768 | 2/1995 |
| JP | 11031130 A2 | 2/1999 |
| JP | 11032037 A2 | 2/1999 |
| JP | 11205306 A2 | 7/1999 |
| JP | 11215121 A2 | 8/1999 |
| JP | 2000215165 A2 | 8/2000 |

| | | | |
|---|---|---|---|
| JP | 2005218143 A2 | 8/2005 | |
| JP | 2005253109 A2 | 9/2005 | |
| JP | 2006180562 A2 | 7/2006 | |
| WO | WO 83/04461 A1 | 12/1983 | |
| WO | WO 92/20022 A1 | 11/1992 | |
| WO | WO 93/01550 A1 | 1/1993 | |
| WO | WO 93/11480 A1 | 6/1993 | |
| WO | WO 94/03003 A1 | 2/1994 | |
| WO | WO 96/13814 A1 | 5/1996 | |
| WO | WO 96/24092 A2 | 8/1996 | |
| WO | WO 96/27155 A2 | 9/1996 | |
| WO | WO 97/25800 A1 | 7/1997 | |
| WO | WO 97/37492 A1 | 10/1997 | |
| WO | WO 97/41661 A2 | 11/1997 | |
| WO | WO 97/43761 A2 | 11/1997 | |
| WO | WO 98/09209 A1 | 3/1998 | |
| WO | WO 98/10561 A1 | 3/1998 | |
| WO | WO 98/11690 A1 | 3/1998 | |
| WO | WO 98/19431 A1 | 5/1998 | |
| WO | WO 98/43426 A1 | 10/1998 | |
| WO | WO 98/45768 A1 | 10/1998 | |
| WO | WO 99/24928 A2 | 5/1999 | |
| WO | WO 99/34553 A1 | 7/1999 | |
| WO | WO 99/35782 A1 | 7/1999 | |
| WO | WO 99/48296 A1 | 9/1999 | |
| WO | WO 99/60461 A1 | 11/1999 | |
| WO | WO 99/60750 A2 | 11/1999 | |
| WO | WO 00/04727 A2 | 1/2000 | |
| WO | WO 00/05898 A2 | 2/2000 | |
| WO | WO 00/46994 A1 | 8/2000 | |
| WO | WO 00/59152 A2 | 10/2000 | |
| WO | WO 00/62260 A1 | 10/2000 | |
| WO | WO 00/72118 A1 | 11/2000 | |
| WO | WO 00/73922 A2 | 12/2000 | |
| WO | WO 01/03044 A1 | 1/2001 | |
| WO | WO 01/37209 A1 | 5/2001 | |
| WO | WO 2004/034223 A2 | 4/2004 | |
| WO | WO 2004/103843 | 12/2004 | |

OTHER PUBLICATIONS

Blaze et al, "Atomic Proxy Cryptography" Draft (Online) (Nov. 2, 1997) XP002239619 Retrieved from the Internet.

No Author, "Capability- and Object-Based Systems Concepts," Capability-Based Computer Systems, pp. 1-19 (no date).

Cox, "Superdistribution" Wired Magazine (Sep. 1994) XP002233405 URL:http://www.wired.com/wired/archive/2.09/superdis_pr.html>.

Dunlop et al, Telecommunications Engineering, pp. 346-352 (1984).

ElGamal, "A Public Key Cryptosystem and a Signature Scheme Based on Discrete Logarithms," IEEE Transactions on Information Theory IT-31(4):469-472 (Jul. 1985).

Gheorghiu et al., "Authorization for Metacomputing Applications" (no date).

Iannella, ed., Open Digital Rights Language (ODRL), pp. 1-31 (Nov. 21, 2000).

Kahle, wais.concepts.txt, Wide Area Information Server Concepts, Thinking Machines Version 4, Draft, pp. 1-18 (Nov. 3, 1989).

Kahn, "Deposit, Registration and Recordation in an Electronic Copyright Management System," Technical Report, Corporation for National Research Initiatives, Reston, Virginia (Aug. 1992) URL:http://www.cni.org/docs/ima.ip-workshop/kahn.html.

Kahn et al, "The Digital Library Project, vol. 1: The World of Knowbots (Draft), An Open Architecture for a Digital Library System and a Plan for its Development," Corporation for National Research Initiatives, pp. 1-48 (Mar. 1988).

Kohl et al, Network Working Group Request for Comments: 1510, pp. 1-112 (Sep. 1993).

Lee et al, CDMA Systems Engineering Handbook (1998) [excerpts but not all pages numbered].

Mambo et al, "Protection of Data and Delegated Keys in Digital Distribution," Information Security and Privacy. Second Australian Conference, ACISP '97 Proceedings, pp. 271-282 (Sydney, NSW, Australia, Jul. 7-9, 1997, 1997 Berlin, Germany, Springer-Verlag, Germany), XP008016393 ISBN: 3-540-63232-8.

Mambo et al, "Proxy Cryptosystems: Delegation of the Power to Decrypt Ciphertexts,", IEICE Trans. Fundamentals vol. E80-A, No. 1:54-63 (Jan. 1997) XP00742245 ISSN: 0916-8508.

Microsoft Word, Users Guide, Version 6.0, pp. 487-489, 549-555, 560-564, 572-575, 599-613, 616-631 (1993).

Ojanperä and Prasad, eds., Wideband CDMA for Third Generation Mobile Communications (1998) [excerpts but not all pages numbered].

Perritt, "Knowbots, Permissions Headers and Contract Law," Paper for the Conference on Technological Strategies for Protecting Intellectual Property in the Networked Multimedia Environment, pp. 1-22 (Apr. 2-3, 1993 with revisions of Apr. 30, 1993).

Raggett, (Hewlett Packard), "HTML+(Hypertext markup language)," pp. 1-31 (Jul. 12, 1993) URL:http://citeseer.ist.psu.edu/correct/340709.

Samuelson et al, "Intellectual Property Rights for Digital Library and Hypertext Publishing Systems: An Analysis of Xanadu," Hypertext '91 Proceedings, pp. 39-50 (Dec. 1991).

No Author, "Softlock Services Introduces . . . Softlock Services" Press Release (Jan. 28, 1994).

No Author, "Appendix III—Compatibility with HTML," No Title, pp. 30-31 (no date).

No Editor, No Title, Dictionary pages, pp. 469-472, 593-594 (no date).

Benoit, Digital Television MPEG-1, MPEG-2 and Principles of the DVB System, pp. 75-80, 116-121 (no date).

Benoit, Digital Television MPEG-1, MPEG-2 and Principles of the DVB System, $2^{nd}$ edition, pp. 74-80 (no date).

AH Digital Audio and Video Series, "DTV Receivers and Measurements," Understanding Digital Terrestrial Broadcasting, pp. 159-164 (no date).

O'Driscoll, The Essential Guide to Digital Set-Top Boxes and Interactive TV, pp. 6-24 (no date).

Ius Mentis, "The ElGamal Public Key System," pp. 1-2 (Oct. 1, 2005) online at http://www.iusmentis.com/technology/encyrption/elgamal/.

Schneier, "Crypto Bibliography," Index of Crypto Papers Available Online, pp. 1-2 (online) (no date).

No Author, No Title, pp. 344-355 (no date).

No Author, "Part Four Networks," No Title, pp. 639-714 (no date).

Microsoft Word User's Guide, pp. 773-774, 315-316, 487-489, 561-564, 744, 624-633 (1993).

No Author, "What is the ElGamal Cryptosystem," p. 1 (Nov. 27, 2006) online at http://www.x5.net/faqs/crypto/q29.html.

Johnson et al., "A Secure Distributed Capability Based System," ACM, pp. 392-402 (1985).

Wikipedia, "El Gamal Encyption," pp. 1-3 (last modified Nov. 2, 2006) online at http://en.wikipedia.org/wiki/ElGamal_encryption.

Blaze, "Atomic Proxy Cryptography," p. 1 Abstract (Oct. 20, 1998).

Blaze, "Matt Blaze's Technical Papers," pp. 1-6 (last updated Aug. 6, 2006)].

Online Search Results for "inverted file", "inverted index" from www.techweb.com, www.cryer.co.uk, computing-dictionary. thefreedictionary.com, www.nist.gov, en.wikipedia.org, www.cni.org, www.tiscali.co.uk (Jul. 15-16, 2006).

Corporation for National Research Initiatives, "Digital Object Architecture Project", http://www.nnri.reston.va.us/doa.html (updated Nov. 28, 2006).

Stefik, Summary and Analysis of A13 (Kahn, Robert E and Vinton G Cerf, "The Digital Library Project, vol. 1: The World of Knowbots (Draft), An Open Architecture for a Digital Library System and a Plan for its Development," Corporation for National Research Initiatives (Mar. 1988)), pp. 1-25 (May 30, 2007).

Johnson et al., "A Secure Distributed Capability Based System," Proceedings of the 1985 ACM Annual Conference on the Range of Computing: Mid-80's Perspective: Mid-80's Perspective *Association for Computing Machinery* pp. 392-402 (1985).

International Search Report dated Nov. 19, 2003.

European Supplementary Search Report for EP03809657 dated Dec. 22, 2008.

Delaigle, "Digital Watermarking," Spie Conference in Optical Security and Counterfeit Deterrence Techniques, San Jose, CA (Feb. 1996).

Perritt, "Technologies Strategies for Protecting Intellectual Property in the Networked Multimedia Environment," Knowbots, Permissions Headers and Contract Law (Apr. 2-3, 1993).

* cited by examiner

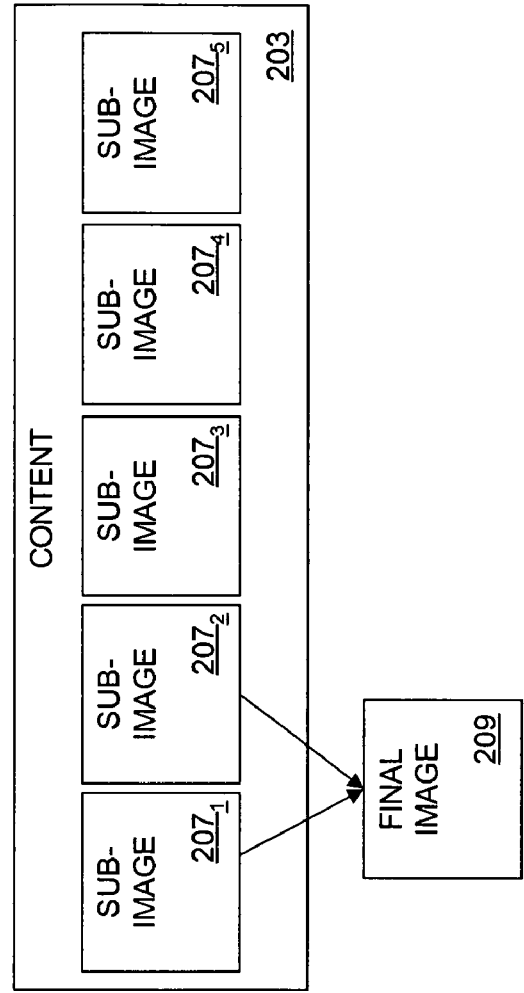

SYSTEM AND METHOD FOR CONTROLLING RIGHTS EXPRESSIONS BY STAKEHOLDERS OF AN ITEM

BACKGROUND OF THE INVENTION

1. Field of the Invention

The exemplary embodiments of the present invention generally relate to distribution of digital works and more particularly to controlling usage rights to digital works or other items by stakeholders thereof.

2. Description of Related Art

One of the most important needs to enable the development of widespread distribution of digital works, for example, documents or other content in forms readable by computers, and management of the use of digital works via electronic means, and the Internet in particular, is the ability to designate and enforce the intellectual property rights and other rights of content owners, consumers and other stakeholders during the distribution and use of digital works. Efforts to meet this need have been termed Intellectual Property Rights Management (IPRM), Digital Property Rights Management (DPRM), Intellectual Property Management (IPM), Rights Management (RM), and Electronic Copyright Management (ECM), collectively referred to as Digital Rights Management (DRM) herein. There are a number of issues to be considered in digital rights management. For example, authentication, authorization, accounting, payment and financial clearing, rights specification, rights verification, rights enforcement, and document protection issues should be addressed. Commonly-assigned U.S. Pat. No. 5,530,235, No. 5,629,980, No. 5,634,012, No. 5,638,443, No. 5,715,403, No. 6,233,684, and No. 6,236,971, the entire disclosures of all of which are hereby incorporated by reference herein, disclose Digital Rights Management systems and methods addressing these and other issues.

In the world of printed documents, a work created by an author usually can be provided to a publisher, which can format and print numerous copies of the work. Such copies then can be sent by a distributor to bookstores or other retail outlets from which the copies can be purchased by end users. While the low quality of copying and the high cost of distributing printed material have served as deterrents to unauthorized copying of most printed documents, it is far too easy to copy, modify, and redistribute unprotected digital works. Accordingly, some method of protecting digital works is necessary to make it more difficult to copy or otherwise use such works without authorization.

It has been widely recognized that it is difficult to prevent, or even deter people from making unauthorized copies, distributions or other uses of electronic works within current general-purpose computing and communications systems, such as personal computers, workstations, and other devices connected over communications networks, such as local area networks (LANs), intranets, and the Internet. Many attempts to provide hardware-based solutions to prevent unauthorized copying have proven to be unsuccessful. In addition, hardware-based solutions can fail to protect the rights of consumers, and the like, because such solutions can prevent exercise of legitimate rights, for example, such as authorized copying. The proliferation of high bandwidth or broadband communications technologies will render it even more convenient to distribute large documents electronically, including video files, such as full-length motion pictures, and thus will remove remaining deterrents to unauthorized copying, distribution or other uses of digital works, as well as increase the need to enable authorized use. Accordingly, Digital Rights Management technologies are becoming a high priority.

Two basic Digital Rights Management schemes have been employed to attempt to solve the document protection problem, including secure containers and trusted systems. A secure container or an encrypted document offer a way to keep document contents encrypted until a set of authorization conditions are met and some copyright terms are honored, such as payment for use. After the various conditions and terms are verified with the document provider, the document can be released to the user in clear form. Commercial products, such as CRYPTOLOPES from IBM and DIGIBOXES from InterTrust can fall into this category. The secure container approach provides a solution to protecting the document during delivery over insecure channels, but does not provide any mechanism to prevent legitimate users from obtaining the clear document and then using and redistributing the clear document in violation of intellectual property rights of the content owners.

Cryptographic mechanisms typically are used to encrypt or encipher documents that are then distributed and stored publicly, and ultimately privately deciphered by authorized users. Such mechanisms provide a basic form of protection during document delivery from a document distributor to an intended user over a public network, as well as during document storage on an insecure medium.

In the trusted system approach, the entire system is responsible for preventing unauthorized use and distribution of the document. Building a trusted system usually entails introducing new hardware, such as a secure processor, secure storage and secure rendering devices. This also requires that all software applications that run on trusted systems be certified to be trusted. While building tamper-proof trusted systems is a real challenge to existing technologies, current market trends suggest that open and untrusted systems, such as personal computers (PCs) and workstations using browsers to access the Web, will be the dominant systems used to access digital works. In this sense, existing computing environments, for example, PCs, laptop computers, handheld computers, workstations, and the like, equipped with popular operating systems, such as Windows, Macintosh, Linux, UNIX, and the like, rendering applications, such as Web browsers, and the like, typically are not trusted systems and typically cannot be made into trusted systems without significantly altering the architectures thereof. However, alteration of the architecture defeats a primary purpose of the Web, such as flexibility and compatibility.

U.S. Pat. No. 5,634,012, for example, discloses a system for controlling the distribution of digital documents, wherein each rendering device can include a repository associated therewith. A predetermined set of usage transaction steps can be used to define a protocol used by the repositories for carrying out usage rights associated with a document. Conceptually, a repository can include a set of functional specifications defining core functionality. A repository can include a trusted system in that the repository can maintain physical integrity, communications integrity and behavioral integrity. A repository can be removable or stationary, can be big or small or portable, can be in any suitable shape, such as a card or smartcard, or can have other functionalities, such as a microprocessor.

Usage rights can be encapsulated with the document content or otherwise associated with the document to travel with the document. The usage rights can permit various type or manners of use of the content, such as viewing only, use once, distribution, and the like. Usage rights can be granted based on payment or other conditions or variables and are generally set prior to distribution to the user. For example, usage rights may grant a user of content certain privileges, such as the ability to view and print the content, in exchange for a specific fee. However, there are dynamic conditions that can affect the cost or desirability of distributing content and Digital Rights Management techniques typically do not account for such dynamic conditions.

SUMMARY OF THE INVENTION

Therefore, there is a need for a system and method that allows for the control of usage rights based on dynamic conditions. In addition, there is a need for a system and method that allows for the control of usage rights to digital works or other items by stakeholders thereof. The above and other needs are addressed by the exemplary embodiments of the present invention, which provide an improved system and method for controlling usage rights to digital works or other items by stakeholders thereof.

Accordingly, in one aspect of an embodiment of the present invention, there is provided a method for controlling a rights expression specifying a manner of use of an item, including specifying by a provider of an item a rights expression indicating a manner of use of the item by a recipient of the item and a condition for use of the item by the recipient, the condition indicating that the use of the item by the recipient is subject to control by a stakeholder; associating the rights expression with the item; and controlling by the stakeholder the use of the item by the recipient based on the condition in the rights expression.

In another aspect of an embodiment of the present invention, there is provided a system for controlling a rights expression specifying manners of use of an item, including means for specifying by a provider of an item a rights expression indicating a manner of use of the item by a recipient of the item and a condition for use of the item by the recipient, the condition indicating that the use of the item by the recipient is subject to control by a stakeholder; means for associating the rights expression with the item; and means for controlling by the stakeholder the use of the item by the recipient based on the condition in the rights expression.

In another aspect of an embodiment of the present invention, there is provided a method for controlling a rights expression specifying a manner of use of an item, including specifying by a provider of an item a rights expression indicating a manner of use of the item by a recipient of the item and a condition for use of the item by the recipient, the condition indicating that the use by the recipient of the item is subject to control; associating the rights expression with the item; and controlling the use by the recipient of the item based on the condition in the rights expression.

In another aspect of an embodiment of the present invention, there is provided a system for controlling a rights expression specifying manners of use of an item, including means for specifying by a provider of an item a rights expression indicating a manner of use of the item by a recipient of the item and a condition for use of the item by the recipient, the condition indicating that the use by the recipient of the item is subject to control; means for associating the rights expression with the item; and means for controlling the use by the recipient of the item based on the condition in the rights expression.

In another aspect of an embodiment of the present invention, there is provided a method for protecting a recipient of an item by permitting the recipient to use the item in a specified manner within a system for enforcing rights expressions that specify a manner of use of an item, including specifying a rights expression associated with an item, the rights expression indicating parameters of use of the item to which the a recipient is entitled; specifying a stakeholder that is operative to insure that the recipient is permitted to use the item in accordance with the parameters of use; enforcing the rights expression; and controlling by the stakeholder the enforcing step to ensure that the use of the item is in accordance with the parameters of use.

In another aspect of an embodiment of the present invention, there is provided a system for protecting a recipient of an item by permitting the recipient to use the item in a specified manner for enforcing rights expressions that specify a manner of use of an item, including means for specifying a rights expression associated with an item, the rights expression indicating parameters of use of the item to which the a recipient is entitled; means for specifying a stakeholder that is operative to insure that the recipient is permitted to use the item in accordance with the parameters of use; means for enforcing the rights expression; and means for controlling by the stakeholder the means for enforcing to ensure that the use of the item is in accordance with the parameters of use.

Still other aspects, features, and advantages of the present invention are readily apparent from the following detailed description, simply by illustrating a number of exemplary embodiments and implementations, including the best mode contemplated for carrying out the present invention. The present invention is also capable of other and different embodiments, and its several details can be modified in various respects, all without departing from the spirit and scope of the present invention. Accordingly, the drawings and descriptions are to be regarded as illustrative in nature, and not as restrictive.

BRIEF DESCRIPTION OF THE DRAWINGS

The present invention is illustrated by way of example, and not by way of limitation, in the figures of the accompanying drawings and in which like reference numerals refer to similar elements and in which:

FIG. 3 illustrates an exemplary lookup table of a rights module that can be employed with the exemplary embodiments of FIGS. 1, 2 and 4-8;

FIG. 4 illustrates an exemplary technique for varying of resolution of an image that can be employed in the exemplary embodiments of FIGS. 1-3 and 5-8;

DETAILED DESCRIPTION OF THE EXEMPLARY EMBODIMENTS

Figure 1:
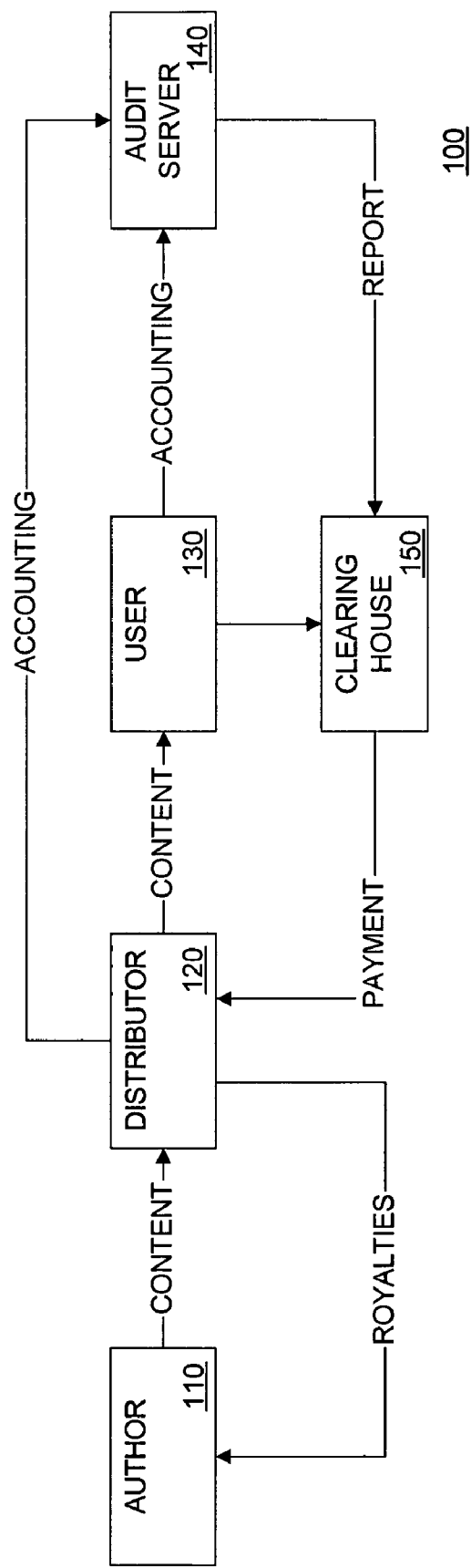
FIG. 1 illustrates an exemplary digital content distribution system on which various exemplary embodiments of the present invention can be implemented.

A system and method for controlling usage rights to digital works or other items by stakeholders thereof are described. In the following description, for purposes of explanation, numerous specific details are set forth in order to provide a thorough understanding of the present invention. It is apparent to one skilled in the art, however, that the present invention can be practiced without these specific details or with equivalent arrangements. In some instances, well-known structures and devices are shown in block diagram form in order to avoid unnecessarily obscuring the present invention.

In an exemplary embodiment, conditional or consequential rights associated with a document allow for the limited usage of content, for example, based on an absolute value, a relative value, and the like. For example, the starting period of a right based on another event or another right can trigger the availability or expiration of availability of content, such as a document. In addition, the time for limiting the usage of content can be expressed as an absolute value, such as a particular time and date or a relative value, such as a usage right expiring two minutes after a first usage.

In an exemplary embodiment, the usage right also can be linked to other events, such as the expiration of a right of another document, and the like. For example, a piece of music could be listened to for only one minute or the music can be listened to only once, after the right to a second piece of music has expired. Thus, in an exemplary embodiment, a condition can include a chain of events that trigger the conditional or consequential rights.

In an exemplary embodiment, remote learning schemes can be implemented, for example, to meet the requirements of the Technology, Education and Copyright Harmonization Act (TEACH Act), which became United States law in Oct. 4, 2002. Generally, under the TEACH Act, if educators remain within the boundaries of the law, the educators can use certain copyrighted works for distance education without permission from or payment of royalties to the copyright owner and without copyright infringement.

Accordingly, in an exemplary embodiment, a college can be configured to offer a first course over the Internet, for example, at a specified time or with access to a second course restricted until the first course has been viewed. In a further exemplary embodiment, for an exam having five sections, for each section, a thirty-minute period can be allocated, and the user can proceed to the next section by using the thirty allocated minutes or, for example, by pushing a button on a user interface, which indicates that the user has completed a given section.

In further exemplary embodiments, other triggering events and/or conditions, such as based on a fifteen-minute break allocated between sections 3 and 4 also, can be used govern transitions between subsequent documents. In an exemplary embodiment, multiple timers or counters can be employed to keep track of the time for each section and/or for all of the sections combined.

In an exemplary embodiment, such conditional or consequential rights assignment can be linked to other events that may or may not have more than one step or condition and/or hierarchical relationship, for example, as further described in commonly assigned, co-pending, U.S. patent application Ser. No. 09/867,748 of Tadayon et al., entitled "METHOD AND APPARATUS FOR HIERARCHICAL ASSIGNMENT OF RIGHTS TO DOCUMENTS AND DOCUMENTS HAVING SUCH RIGHTS," filed May 31, 2001, the entire disclosure of which is hereby incorporated by reference herein. In an exemplary embodiment, hierarchal rights can include usage rights that one user can transfer to another user. In further exemplary embodiments, such hierarchal rights can be configured in a tree structure, and the like. In an exemplary embodiment, the closer the rights of a user are to the original rights in such a tree, the greater are the rights of the user.

In an exemplary embodiment, such a concept can include the concept of subsidiary rights, for example, wherein one grants a right to a user, provided the user satisfies some condition or performs an action. For example, a user can be given the right edit once a copy is made of a document. In a further exemplary embodiment, for joint projects, more than one person can contribute to the document with comments and modifications and/or design changes and in which case a Digital Rights Management system, for example, can keep track of exercised rights, modifications, sources of modifications, dates, order of changes, approvals, vetoes, priorities, and the like. For example, in a paperless office, three approvals from three different departments may be needed for an action item.

In an exemplary embodiment, a rights assignment, for example, can be integrated into an e-mail or electronic messaging system, and the like. For example, an exemplary system can be configured such that a content owner can assign different rights to different individuals and share or limit rights to information or files based on such rights. In an exemplary embodiment, a friend can be allowed to request permission to view or use a particular file or further distribute the file to another individual or to everyone in the address book or the public as a whole.

In an exemplary embodiment, the rights can be configured, for example, to limit the extent to which a user can add or delete individuals from a mailing list or address book, and the like. For example, the right to view people in an address book can be restricted based on a usage right. In a further exemplary embodiment, while in an instant messaging mode, a user can be allowed to have the right to exclude or limit other users to particular content.

If the set of assigned rights are commonly used for different documents, the rules can be expressed as, for example, templates, such as those discussed in commonly assigned, co-pending, U.S. patent application Ser. No. 10/046,695 of Lao et al., entitled "METHOD AND APPARATUS FOR MANAGING DIGITAL CONTENT USAGE RIGHTS," filed Jan. 17, 2002, the entire disclosure of which is hereby incorporated by reference herein, multi-hyphen purpose templates, and the like. In general, a template can be used whenever a user desires to assign a predetermined set of rights to one or more, such as a set, of additional users. This template can contain, for example, a set of usage rights that may be particularly tailored towards the user class, accounting instructions, and the like.

Referring now to the drawings, wherein like reference numerals designate identical or corresponding parts throughout the several views, and more particularly to FIG. 1 thereof, there is illustrated an exemplary digital content distribution or Digital Rights Management system 100 that can be used in connection with the described exemplary embodiments. The exemplary system 100 of FIG. 1, for example, can be employed for the electronic distribution of digital works and other items, such as correspondence, books, magazines, journals, newspapers, other papers, software, audio and video clips, other files or objects, and the like. Thus, a digital work can include any suitable type of element having content in computer readable form. Content can include a viewable or otherwise usable portion of a digital work.

In an exemplary embodiment, a usage right can include a specification of a permitted manner of use of an item, which can include anything for which use can be controlled by associated usage rights, such as digital content, software, services, goods, and resources. A resource can include a digital device or portion thereof to which access can be controlled by associated usage rights. A rights expression can include any suitable expression of a usage right, such as a rights label, a license, or fragments thereof. A rights label can include a prepackaged set of usage rights not associated with a specific item. A license can include a prepackaged set of usage rights including an item association. A rights expression language, such as extensible Rights Markup Language (XrML), extensible Access Control Markup Language (XACML), Open Digital Rights Language (ODRL), and the like, can be used to express a rights expression and can include any suitable language having predefined syntax and semantics and that can be used to express a usage right.

In an exemplary embodiment, usage rights can be used to specify manners of use. A manner of use can include the ability to use an item in a specified way for a specified period of time, to buy an item for a specified period of time, and the like. In an exemplary embodiment, usage rights can be bundled, can be used to specify transfer rights, such as distribution rights, can be used to permit granting of usage rights to others or to permit the derivation of usage rights, and the like. Such usage rights also can be referred to as meta-rights, which can include rights that can be manipulated, modified, and the like, to derive other usage rights. Thus, the meta-rights can include usage rights to usage rights, such as rights to offer, grant, obtain, transfer, delegate, track, surrender, exchange, revoke, and the like, usage rights to/from others. The meta-rights can include the rights to modify the conditions associated with other rights. For example, a meta-right can include the right to extend or reduce the scope of a particular right. A meta-right also can include a right to extend or reduce the validation period of a right.

In an exemplary embodiment, one or more conditions to be satisfied in order to exercise the manner of use in a specified usage right can be employed. For, example, a condition can include the payment of a fee, the submission of personal data or any other suitable requirement desired before permitting exercise of a manner of use. The conditions can include access conditions. For example, access conditions can apply to a particular group of users, such as students in a university or members of a book club. In an exemplary embodiment, a condition can be that a user is a particular person or a member of a particular group. In an exemplary embodiment, rights and conditions can exist as separate entities or can be combined.

In an exemplary embodiment, state variables can be used to track dynamic states, conditions, and the like. For example, the state variables can include variables having values that represent the status of an item, the status of usage rights, the status of a license or other dynamic conditions. The state variables can be tracked, for example, by clearinghouse or another device, for example, based on identification mechanisms in a license, and the like, associated with an item. In an exemplary embodiment, a rights language, such as XrML, XACML, ODRL, and the like, can be used to express a rights expression specifying rights, conditions, state variables, and the like. In a further exemplary embodiment, however, the rights and conditions can be specified in any suitable manner. Accordingly, the process of specifying rights can include any suitable process for associating rights with an item.

In FIG. 1, an author 110 can create original content, such as documents, and the like, and can pass the content to a distributor 120 for distribution. In an exemplary embodiment, the author 110 can be the creator of the content. In further exemplary embodiments, however, an author can include the creator, owner, editor or other entity controlling the content or an agent, such a publisher, of one of such entities. In a further exemplary embodiment, the author 110 also can distribute such documents directly, for example, without involving another party, such as the distributor 120, and thus the author and distributor can be the same entity.

The division of functions set forth in FIG. 1, however, can be more efficient, as such division allows the author 110 to concentrate on content creation and not the administrative functions of distribution. In addition, such a breakdown facilitates economies of scale by permitting the distributor 120 to associate with a number of authors 110.

The distributor 120 can distribute the digital works to a user 130, for example, upon a request from the user 130. In an exemplary embodiment, the created work can be distributed as a document including the content and associated usage rights and, for example, in encrypted form. In an exemplary embodiment, the distributor 120 can encrypt such works, for example, with a random key and then can encrypt the random key with a public key corresponding to the user 130. Thus, the encrypted work can be customized for a particular user 130. The user 130 then can use a corresponding private key of the user to un-encrypt the random key and use the un-encrypted random key to un-encrypt and view the content of the work.

Payment for the work can be passed from the user 130 to the distributor 120, for example, by way of a clearinghouse 150, which collects requests from the user 130 and from other users who wish to use particular content. The clearinghouse 150 also can collect payment information, such as debit transactions, credit card transactions, or other known electronic payment schemes, and forward the collected payments, for example as a payment batch to the distributor 120. In an exemplary embodiment, the clearinghouse 150 can retain a share of the payment from the user 130 as a fee for the clearinghouse 150 services.

The distributor 120 can retain a portion of the batch payment from the clearinghouse 150 for the distribution services and forward a payment, for example, such as royalties, and the like, to the author 110. In an exemplary embodiment, the distributor 120 can compile a bundle or batch of user requests for a single work before distributing the work, wherein, for example, a single instance of the encrypted work can be generated for un-encryption by all of the requesting users 130.

In an exemplary embodiment, when the user 130 requests or uses content of a work, an accounting message can be sent to an audit server 140, which can be used to ensure that each request by the user 130 matches with a document sent to the user 130 by the distributor 120. Such accounting information can be received by the audit server 140, for example, directly from the distributor 120. Any determined inconsistencies in such transactions can be transmitted via a report to the clearinghouse 150, which can then adjust the payment batches made to the distributor 120 accordingly. Advantageously, such an accounting scheme can be operative in reducing the possibility of fraud during electronic distribution and can be used to handle time-dependent usage rights that can result in charges that vary depending on the duration or other extent of use.

Figure 2:
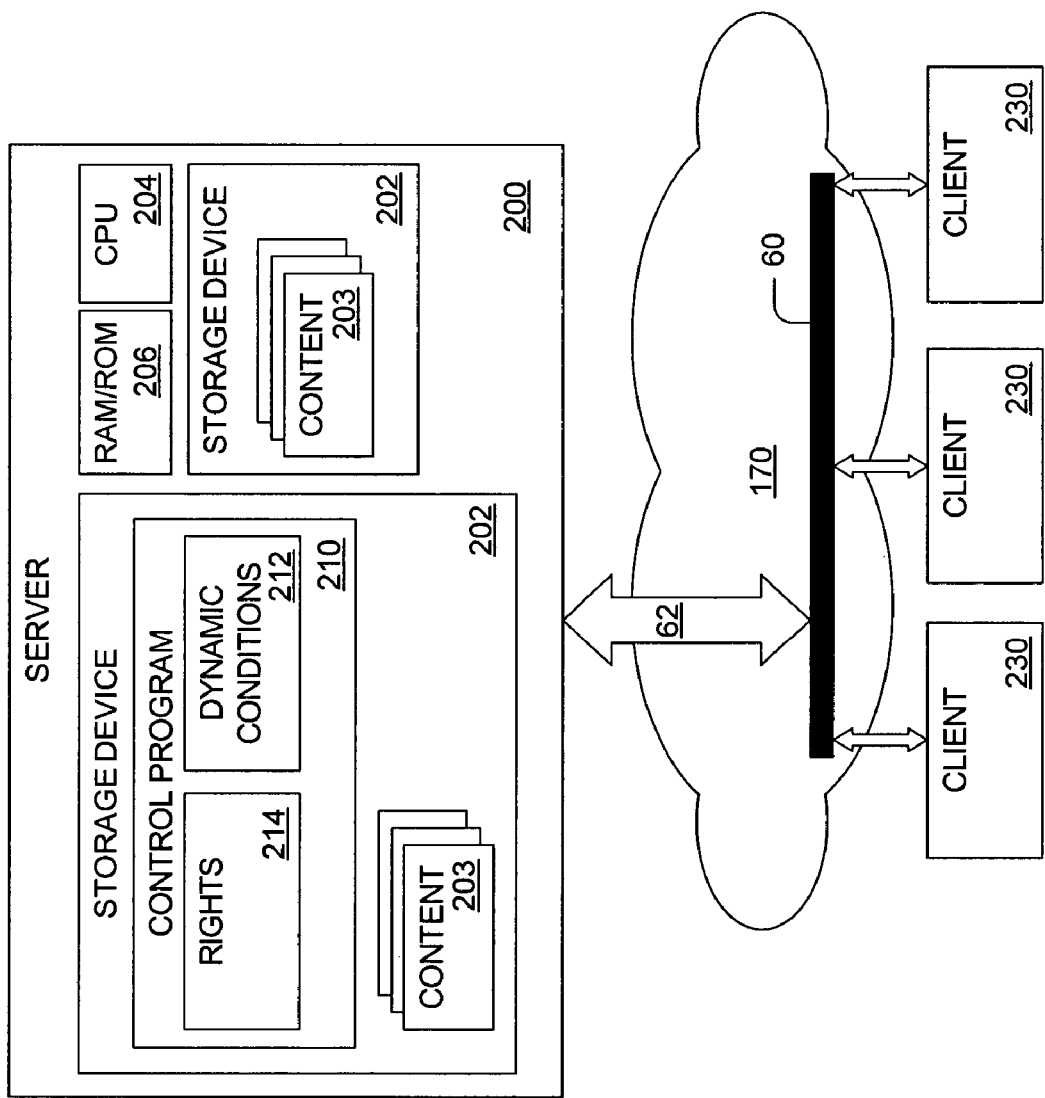
FIG. 2 illustrates an exemplary computer architecture that can be employed with the exemplary embodiments of FIGS. 1 and 3-8.

FIG. 2 illustrates an exemplary computer architecture that can be employed with the exemplary embodiments of FIGS. 1 and 3-8. The exemplary computer architecture, for example, can be used for downloading digital works from the distributor 120 to the user 130. In FIG. 2, the exemplary architecture can utilize a communications network 170, such as the Internet, and the like, for data transfer. The user 130 can employ a client computer 230, such as a personal computer, a personal digital assistant (PDA), a data terminal, a kiosk, and the like, to communicate with a computer server 200, for example, associated with the distributor 120. The client 230 can be coupled to an Internet backbone 60, for example, through a modem, phone line and Internet Service Provider (ISP), and the like. The client 230 can run an operating system, such as Microsoft Windows 98, Microsoft Windows 2000, and the like, having a graphical user interface (GUI) and an application program, such as a Web browser, and the like, that permits the graphical user interface to be used to control communications over the Internet, for example, through Hypertext Transfer Protocol (HTTP), and the like, based on a standard page description language, such as Hypertext Markup Language (HTML), and the like. A collection of Internet servers using HTTP can be employed, such as the World Wide Web or the Web, and the like.

In an exemplary embodiment, the server 200 can be associated with the distributor 120 and, for example, can include a personal computer, a server, a minicomputer, a collection of computers, a computer network, and the like. The server 200 can include storage devices 202, such as magnetic hard discs, and the like, for storing information including a control program 210 and content 203, such as digital works and other items, a central processing unit (CPU) 204 for controlling the flow of information in accordance with the control program 210, and random access memory (RAM) and/or read only memory 206 used as a workspace for the CPU 204. In an exemplary embodiment, the server 200 can be coupled to the Internet backbone 60, for example, through a high-speed communications link 62. In a further exemplary embodiment, the server 200 can be coupled to the Internet backbone 60, for example, through a modem and an ISP in a manner similar to the client 230 or in any other suitable manner.

The control program 210 can be stored in one or more of the storage devices 202 and can include a dynamic conditions module 212, for example, which can be used to track a plurality of dynamic conditions. The control program 210 can include a rights module 214, which can be used to set usage rights for content in accordance with the dynamic conditions monitored by dynamic conditions module 212.

In an exemplary embodiment, a dynamic condition, for example, can include the time of day. For example, the exemplary system can be configured to allow a user can to access a popular web site to obtain content during off-peak hours, in terms of web site traffic, at a reduced fee. In an exemplary embodiment, to encourage content distribution during off-peak hours and a more uniform distribution of traffic to the server 200, the distributor 120 can charge lower fees for the same content during off-peak hours by monitoring time with the dynamic conditions module 212, for example, which can reference a real time clock of the server 200, and by setting the corresponding usage rights in a dynamic manner with the rights module 214 based on the given conditions, such as the time. The usage rights can be assigned in any suitable manner, for example, including techniques, for example, as disclosed in the commonly-assigned U.S. Pat. No. 5,530,235, No. 5,629,980, No. 5,634,012, No. 5,638,443, No. 5,715,403, No. 6,233,684, and No. 6,236,971, incorporated by reference herein.

FIG. 3 illustrates an exemplary lookup table of the rights module 214 that can be employed with the exemplary embodiments of FIGS. 1, 2 and 4-8. In FIG. 3, conditions values 216 can be listed in the left column of the exemplary lookup table and the corresponding usage rights 218 can be listed in the right column of the exemplary lookup table. For example, condition value A can include a value corresponding to 9 am to 5 pm in the United States Eastern Standard Time, condition value B can include a value corresponding to 5 pm to 11 pm in the United States Pacific Standard Time, and condition value C can include a value corresponding to 11 pm to 9 am in the United States Eastern Standard Time. The corresponding usage rights 218 can include fees or discounts off of standard fees based on the time values A-C.

In an exemplary embodiment, if the server 200 tends to be most busy during time A and least busy during time C, the price X can be higher than the price Y, which can be higher than the price Z. In a further exemplary embodiment, if X, Y, and Z are expressed as discounts, the inverse relationship can be true, for example, such as Z can be higher than Y, which can be higher than X. The usage rights 218 can be assigned to one or more of the digital works 203, for example, on a periodic basis, just prior to distribution or in any suitable manner.

In an exemplary embodiment, such a fee schedule and/or other usage rights can be dynamically adjusted based on the status of the network in general or server in particular, for example, by obtaining various load parameters from the network. Accordingly, the rights module 214 can be configured to include a correspondingly more complex lookup table or other logic that combines the various conditions to ascertain the corresponding usage rights 218 for the content. In an exemplary embodiment, the dynamic conditions module 212 can include such software tools for monitoring server loads, for example, including commercially available software packages for monitoring server loads, such as the Web Performance Trainer from Web Performance, Inc., and the like.

In an exemplary embodiment, the concept of dynamic usage rights can be applied to fees or any suitable other rights, conditions, and the like. For example, usage rights that can be specified for a digital work can be changed based on dynamic conditions. In an exemplary embodiment, the ability to print or distribute content, the number of times content can be used, the resolution of an image in the content, and the like, can be set and changed based on dynamic conditions. In an exemplary embodiment, usage rights can include any suitable rights that can be specified by a usage rights language, such as XrML or other grammars for digital rights management, and the like. The logic of the usage rights module 214, for example, can be based on curves, formulas, tables, databases or any other suitable algorithm using predetermined or dynamic schemes, and the like.

In an exemplary embodiment, the percentage of the commission or fee of the distributor 120 can be specified in a usage right that can be varied dynamically. For example, depending on the network conditions or parameters, such as number of the visitors to the web site or corresponding downloads at that moment, and to encourage more uniform distribution of content throughout all hours, the distributor 120 can charge a lower percentage during times of lower use of the server 200. Advantageously, the distributor 120 can reduce the number of servers in a server farm of the server 200 and thus reduce operating costs.

In an exemplary embodiment, the quality or other characteristics of content can be adjusted as usage rights based on dynamic conditions. For example, during peak hours, the user 130 can be allowed to download a low-resolution image of the content or may be charged a premium for downloading a high-resolution image. In an exemplary embodiment, such content can be made available in plurality of resolutions. However, storing multiple resolution images at each desired resolution for each piece of content can be very cumbersome and can take up a large amount of memory in memory the devices 202 and/or other resources. In an exemplary embodiment, advantageously, wavelet decomposition or other subband decomposition technologies can be used to provide flexibility of resolution while reducing resource overhead.

In an exemplary embodiment, wavelet decomposition can include a method of signal processing in which a signal can be divided, decomposed, and the like, into components of various frequency bandwidths. Wavelet decomposition and related transformations, such as described in "Wavelets and Subband Coding," by M. Veterrli and J. Kovacevic, Prentice Hall, 1995, the disclosure of which is incorporated herein by reference, thus, can be employed. Wavelet decomposition has been applied to analyzing the time-frequency domain of various signals and to digital compression technologies.

FIG. 4 illustrates an exemplary technique for varying of resolution of an image that can be employed in the exemplary embodiments of FIGS. 1-3 and 5-8. In FIG. 4, the digital work 203 can be adapted for providing variable resolution images. The content of the work 203, in the form of an image, can be divided into sub-images $207_1$-$207_5$. Each sub-image can corresponds to a wavelet, a frequency component, and the like, of the image.

In an exemplary embodiment, the sub-image $207_1$ can include a ½ resolution image, the sub-image $207_2$ can include a ¼ resolution image, the sub-image $207_3$ can include a ⅛ resolution image, the sub-image $207_4$ can include a 1/16 resolution image and the sub-image $207_5$ can include a 1/32 resolution image. The sub-images $207_1$-$207_5$ can be superposed and downloaded to provide a plurality of possible resolutions. For example, downloading the sub-image $207_1$ provides a ½ resolution image. However, superposing the sub-image $207_1$ with the sub-image $207_2$ provides a higher resolution image 209. Accordingly, the usage rights X, Y, and Z of FIG. 3 can be configured to correspond to the respective rights to download the various sub-images or combinations thereof.

In an exemplary embodiment, the parameters used in subsampling or filtering of the content can be used to determine the quality of the resultant sub-image and can be varied in any suitable manner to make any suitable number of sub-images having any suitable resolution. In a further exemplary embodiment, while the sub-images $207_1$-$207_5$ are illustrated in FIG. 4, the sub-images need not be decomposed and stored, but rather can be decomposed on the fly, for example, using mathematical techniques in the control program 210 to provide the sub-images needed for the desired resolution download.

In an exemplary embodiment, the content owner can grant the right to view, print or copy a wavelet decomposition low-resolution sub-image, for example, for trial or inspection purposes, and the like. In an exemplary embodiment, the sub-images can be attached to the corresponding content for usage rights assignment or can be generated on the fly. In an exemplary embodiment, the components of the image can be included in a same package, and the resolutions or the combination of resolutions can be readily obtained using wavelet decomposition. The various rights and the associated content can be stored at the same location or at different locations.

The exemplary embodiments include recognition that in Digital Rights Management typically the focus has been on giving the owners of content control over the content. Accordingly, the exemplary embodiments include recognition that other stakeholders exist and allow such other stakeholders to have a role in the management of digital rights. For example, such a role can include allowing exercise of control over the distribution and use of content by other stakeholders, for example, such as governments, parents, and the like. Advantageously, the exemplary embodiments allow governments, parents, and the like, to control or monitor or otherwise be involved in what content can be distributed and who can receive or use such content. In a further exemplary embodiment, the governments or parents, and the like, also can be allowed to control the terms under which such content can be distributed or used.

In further exemplary embodiments, however, other stakeholders can be involved, for example, including a corporation or other enterprise or various departments thereof or levels of authority thereof. For example, a composer of an item of music or an author of a book can be configured as a stakeholder, in addition to the publisher of the item. Further exemplary embodiments provide ways, for example, that can be used to deal with rights under the law of some countries, wherein a creator of a work can continue to have rights in a work even after the creator sells the work. Such rights can include moral rights, and the like, and a creator of a work can be included among the stakeholders.

Further exemplary embodiments provide ways, for example, that can be used to deal with laws that permit digital works to be transferred after being acquired regardless, in some cases, of whether another party, for example the creator, owner or distributor, desires that an acquirer have such a right. Such rights can include the first sale doctrine, and the like, and a transferor and a prospective transferee can be included among the stakeholders.

Further exemplary embodiment provide ways, for example, that can be used to deal with laws that permit digital works to be copied or otherwise used, and the like, in certain ways regardless, in some cases, of whether another party, for example, the creator, owner or distributor, desires that a party have such a right. For example, such a right can include the right of a consumer to make copies of a digital work so that it can be used on various devices within a household of the consumer or can include the right to change the format of a digital work or to extract excerpts from the work, and the like. Such rights can include fair use rights, and a party that has such a fair use right can be included among the stakeholders. Thus, advantageously, with the exemplary embodiments, a stakeholder can be specified to ensure that a recipient of an item can use the item in accordance with agreed manners of use or manners of use specified by applicable law or regulation, and the like.

In describing the exemplary embodiments, examples involving digital works are employed, wherein a digital work can include any suitable digital information. For example, digital works that can be consumed by end users can include digital content, such as audios, videos, electronic books (e-books), and the like. However, according to the exemplary embodiments, the end result need not be the acquisition or use of audios, videos or e-books, and the like. For example, the Digital Rights Management of the exemplary embodiments, advantageously, can be applied to goods, services, other items, and the like.

In an exemplary embodiment, for example, the end result can be the consumption of a service offered through the Internet, purchase of a good or the taking of a test, and the like. Accordingly, the concept of there being stakeholders can apply to all such suitable things. Advantageously, with the exemplary embodiment, a parent can keep a child from accessing an Internet site unless permission is granted, a company president can keep unauthorized employees from obtaining car rental services using company resources unless permission is granted, and the like.

In an exemplary embodiment, according to a first exemplary use case, a child can be allowed to acquire a digital work in the form of an item of music, video, and the like, but because of choice of the parent, the child can render, for example, play the music, based on approval from the parent. In a further exemplary embodiment, the child can wish to acquire the music file, but because it is the choice of the parent, the item can be acquired if the parent approves in advance. Accordingly, the parent can be a stakeholder in addition to the provider of the music and the end consumer, the child.

In an exemplary embodiment, according to a second exemplary use case, thousands of people in a country can be allowed to have a digital work in the form of a picture, but because it is the law they can render the digital work, for example, including printing the digital work or viewing the digital work on a computer display, and the like, if the content of the digital work can be cleared by a censor office of the government. In a further exemplary embodiment, thousands of people can wish to acquire a digital work, but because it is the law, the work can be acquired if the government censor office approves. It need not matter why the law making the governmental entity involved was enacted. However, a government concern, for example, could be that the given item might be pornographic in nature, might impact national security, might be legally defamatory or might just be salacious, and the like. Advantageously, the Digital Rights Management of the exemplary embodiments can be used implement what can be decided in a political process.

In an exemplary embodiment, according to third exemplary use case, an author can be allowed to distribute a book on some topic. The government of a given country, however, does not permit a book by such an author on such a topic to be distributed into or from the country unless the contents are approved by the government or, alternatively, unless the government approves the terms and conditions of the distribution of the book. In a further exemplary embodiment, however, it could also be the that such requirement is some other involvement, for example, such as the government itself controlling the distribution of the book. As before, it does not matter why the law requires government involvement. However, such government involvement may be required, for example, because the author is a former employee of a security agency or perhaps is a convicted felon who has a legal obligation to make restitution to victims and the government involvement is to ensure fees paid for consumption of the book go to the victims, and the like. Advantageously, the exemplary Digital Rights Management systems of the exemplary embodiments can be used implement any suitable law, and the like, irrespective of what such a law may be or why such a law may be enacted.

In the exemplary embodiments, a specified condition of the right of the consumer to acquire, render or do something else with respect to an item can be the involvement of a stakeholder. In an exemplary embodiment, such involvement can include that approval is obtained from a specified stakeholder. However, in further exemplary embodiments, such involvement can include actions other than approval, such as that the stakeholder being allowed to track, audit or have some other role with respect to the item. For example, in the third exemplary use case, the government may not care what the editorial content of an e-book of a felon is as long as any fees for the sales thereof are collected in a way authorized by the government so that the victims can be paid. In an exemplary embodiment, the involvement of the government as a stakeholder might continue only for so long as it takes to compensate the victims in the appropriate amounts and thereafter the government can cease to be involved. Accordingly, in the exemplary embodiments, the involvement of a stakeholder can cease or can commence at any appropriate time.

Accordingly, in an exemplary embodiment, a government or other entity as stakeholder, can be allowed to control, approve, and the like, a fee collection or other mechanism associated with electronic distribution of an item, such as an e-book of a felon, and the like. In an exemplary embodiment, a condition can be used to ensure that such distribution is done in an approved manner. The status of such a condition can be checked one or more times, for example, when the item is acquired, each time the item is rendered, each time the item is found to have been changed, on random occasions, continuously or on any other suitable occasions, frequencies, and the like.

In an exemplary embodiment, the first exemplary use case can be implemented such that when a child acquires a musical work, a usage right to render the musical work, for example, by playing, and the like, can include a condition specifying that authorization need be obtained from an authorizing repository with a certain digital address. Such a repository can be controlled by the parent of the child. The musical work can be associated with such a usage right along with a communications link to the authorizing repository. The repository of the child can initiate a request to the authorizing repository and if the authorizing repository responds with an authorization, the right to render the musical work can be exercised.

In an exemplary embodiment, an item cannot be rendered until an authorization is received. In an exemplary embodiment, a usage right can be used to specify that authorization must be obtained upon each rendering, wherein the approving authority, such as a government, parent, and the like, can be allowed to withdraw approval to render an item. Accordingly, even though the musical work may have been approved by the parent to be played numerous times by the child, when the repository of the child requests a subsequent authorization, such a request can be denied and the musical work can no longer be played if the parent so chooses.

In a further exemplary embodiment, when the authorizing repository returns an authorization to render an item, the authorizing repository can be configured to impose a condition, for example, that a subsequent attempt to render the item requires further authorization or that an authorization is good for one time only, and the like. In an exemplary embodiment, the authorizing repository can be embodied on a personal computer, a laptop computer, a server, a transportable hardware device, a handheld device or any other suitable device, and the like. In an exemplary embodiment, the authorizing repository can reside in the same device as the rendering device or software or can reside in the device on which the musical work is stored or in a combination thereof, and the like.

In an exemplary embodiment, the second exemplary use case can be implemented such that thousands of people each can receive an electronic notification that an item, such as a picture, and the like, is available for acquisition, for example, by Internet download or in any other suitable fashion, such as in an off-line manner or by way of a physical medium, and the like. In an exemplary embodiment, such a notification can be accompanied by a usage right that specifies that authorization, permission, and the like, need be obtained, as a condition for acquiring the picture. Such permission can be obtained using the methods of the exemplary embodiments or any other suitable methods.

In an exemplary embodiment, in a situation where people already have acquired the picture, the authorization for the rendering of the picture can be implemented in manners similar to those described with respect to the first exemplary use case, with a salient difference being that thousands of people are requesting such authorization rather the one child. In an exemplary embodiment, the answer to such authorization requests need not be the same for each person requesting authorization. For example, some people can be authorized to render the item while others may not, wherein a condition to authorization can be that a person can establish their identity, that a person can establish that they are over 21 years of age, that a fee is paid, and the like. Advantageously, such conditions could be changed from time to time via the exemplary embodiments. Although the exemplary embodiments are described in terms of rendering, any other suitable usage rights can be authorized or denied, such as copying, moving, modifying, and the like.

The third exemplary use case included an additional element, for example, wherein the content of the e-book was of importance. In an exemplary embodiment, a decision that once the e-book is approved for distribution the e-book cannot be changed unless such change is approved can be implemented. Accordingly, a condition can be used to specify that no changes to the e-book are allowed unless approval can be obtained. For example, the government, as a stakeholder, may not want the e-book to be changed by anyone, be it the author or some other person, even after the e-book is distributed. In an exemplary embodiment, Digital Rights Management techniques can be employed to ensure that content cannot be changed by an unauthorized person. In an exemplary embodiment, persons other than the owner of an item, typically are unauthorized parties. In an exemplary embodiment, an owner can include an author, a publisher, a movie studio, and the like.

In the third exemplary use case, entities that may wish to exercise control over changes to an item and that can be protected against changes being made to the item, for example, can include the author, which is consistent with a typical situation, and the governmental entity. In an exemplary embodiment, a condition can be used to ensure that the government entity approves changes to the item. Accordingly, a usage right, for example, can be used to specify that no person, not even the author, can change the e-book, unless the government approves of such a change or that no change can be made unless such a change is made by the government, and the like.

In further exemplary embodiments, such a condition can be implemented on the basis of one or more entitles being involved in the approval or the changing process, for example, the author and the government or the author or the government or only the author or only the government, and the like. For example, the author can be given the right to make changes subject to government approval, the government can be given the right to make changes with the approval from the author or the author or the government can be eliminated from such a process altogether.

In a further exemplary embodiment, stakeholders can include an author, a publisher of an author, and the like. Advantageously, even after an author sells a work to a publisher, the author can retain control over changes to the work using the exemplary embodiments. The exemplary embodiments, thus, can be employed to implement, protect, enforce, and the like, for example, moral rights under the laws of some countries. In further exemplary embodiments, contract rights of an author with a publisher, for example, can be enforced, protected, and the like. The control or participation of the author or other parties need not be limited to the making of changes, but rather could involve any suitable action, for example, such as the monitoring of the number of copies being distributed, and the like.

The third exemplary use case included an additional element, for example, wherein the government involvement was instigated because of the topic or content of the e-book. In an exemplary embodiment, if an e-book includes such a topic of interest to the government, along with other topics not of interest to the government, the approval processes, and the like, of the exemplary embodiments can be applied to the portions that are within the topic of interest. For example, if the e-book has several chapters or other parts or is a composite work, conditions can be applied to one or more of such parts or to any subset of such parts or the e-book, and the like.

The third exemplary use case included an additional element, for example, wherein the government involvement was instigated because of the particular author of the e-book being a felon. In an exemplary embodiment, if a composite work is authored by multiple persons, the approval processes, and the like, of the exemplary embodiments can be applied to the portions of the composite work authored by the person or person of interest, such as a felon. Advantageously, the exemplary embodiments can be applied to situations involving any suitable number of stakeholders with respect to an item.

In an exemplary embodiment, any suitable number of dynamic conditions can be employed. For example, in the first exemplary use case, the request of the child to play the musical work can be denied by the parent, for example, because the parent withdrew or never gave permission to play the musical work, and the like. Accordingly, the parent can choose not to permit the request of the child to play the musical work and when the status of the corresponding condition is checked, approval can be found to be lacking.

In an exemplary embodiment, however, the parent can thereafter provide other conditions. For example, a usage right associated with the musical work can specify that upon each attempt to render the musical work, or in diverse other instances, the authorizing repository is to be checked and whatever rights and conditions are at that time being specified by the authorizing repository are to be observed. Thus, advantageously, the parent can dynamically change an authorization, for example, from "yes you may render" to "yes you may render, but only ten times," and the like.

Accordingly, any suitable number of things can be dynamically specified, such as the imposition of new conditions or the withdrawal of former rights, and the like. For example, the parent, through the authorizing repository of the exemplary embodiments, can specify that the musical work cannot be played, for example, during school hours. Advantageously, if such school hours change, such a change can be reflected with an appropriate dynamic condition. In further exemplary embodiments, a dynamic condition can be used to specify that an item, such as a musical work, and the like, cannot be copied or if a condition of no copying already existed, that such a restriction can be removed. In further exemplary embodiments, such rights and/or conditions can be dynamically changed with the result that a first request to render an item can result in "yes, but only ten times," while a second request at a later time can result in a "no," for example, reneging on the earlier right to render ten times.

The exemplary embodiments can employ a digital ticket, for example, as further described in U.S. Pat. No. 6,336,971. In an exemplary embodiment, a digital ticket can include a digital token, and the like, possession of which can be a condition for exercising a manner of use specified in a usage right. For example, in the third exemplary use case, the author can acquire from the government agency a digital distribution license for the work that can specify use of a digital ticket. The distribution license can be used to specify that the work cannot be copied or transferred until such time as the government agency involved presents the digital ticket.

In an exemplary embodiment, the digital ticket can be used to represent the certificate of inspection and approval by the government of a digital work or other item or the approval of the terms of distribution of a digital work or other item, and the like. In an exemplary embodiment, when a digital ticket is presented to the clearinghouse 150, the corresponding item then can be distributed. In an exemplary embodiment, when an item is presented to the Digital Rights Management systems of the exemplary embodiments, usage rights associated with the item can include a condition that a digital ticket be presented. In further exemplary embodiments, a usage right can be used to specify that Edit or Embed transactions cannot be performed with respect to an item, for example, even by an author of the item, unless a government office presents a digital ticket evidencing approval of such a change. In further exemplary embodiments, any other suitable rights or conditions can be specified as allowed or not allowed, and the like.

In an exemplary embodiment, a digital ticket can be employed with the second exemplary use case, wherein when the thousands of people each receive the electronic notification that the picture is available for acquisition, a digital ticket can be included with such notification and corresponding usage right. For example, the corresponding usage right can be configured to give the right to obtain the picture and render the picture, but a condition for exercising such a usage right can be that the digital ticket be punched by a specified special ticket agent, for example, residing on a central control repository controlled by the government or other entity, as a stakeholder.

In an exemplary embodiment, each of the thousands of persons can submit a respective digital ticket to such a special ticket agent for punching. The picture can have been reviewed by the government, which can decide whether or not certain persons are permitted to obtain the picture, render the picture, and the like. For example, only requests from certain authorized repositories can be honored in order to obtain or render the picture. In an exemplary embodiment, the special ticket agent can be configured to check each digital ticket against a database that includes information as to whether or not a requesting repository is designated as being authorized to obtain or render the picture.

In an exemplary embodiment, when such a database indicates that a requesting repository is an authorized repository, the corresponding digital ticket can be punched, wherein the corresponding condition is thus satisfied and the requesting repository can be permitted to obtain or render the picture. In an exemplary embodiment, if the requesting repository is not authorized the digital ticket is not punched. In further exemplary embodiments, the database can be dynamically changed, such that a first request to render an item can result in a "yes" decision, while a second request at a later time to render the item can result in a "no" decision. In further exemplary embodiments, the ticket agent can impose a condition on the "yes" decision to the request to render the item, for example, such as if the item is rendered by viewing, the right to view terminates after one hour, and the like.

In an exemplary embodiment, according to a first exemplary distribution model, and via appropriate usage rights and/or conditions, upon release of a movie, a studio can offer to sell the movie by download for $5, including the right to view the movie three times within a ninety day period or by download for $4, including the right to view the movie one time within a ninety day period. Advantageously, a year after release of the movie, the studio can lower the price for downloads to $3, with the right to view the movie an unlimited number times being specified in corresponding usage rights and/or conditions. In addition, with appropriate usage rights and/or conditions, the studio can allow previous customers, such as the customers that paid $5 or $4 for downloading the movie, the right to unlimited view of the movie. In an exemplary embodiment, such customers need not get a refund, but a refund can be implemented in further exemplary embodiments using the exemplary systems and methods.

In an exemplary embodiment, two years after the release of the movie, with appropriate usage rights and/or conditions, the studio can allow previous customers to have the right to make an unlimited number of copies of the movie and to transfer a copy of the movie to whomever they wish, wherein, previously, making a copy of the movie was not allowed. However, to view the movie, for example, render the movie by playing, each new recipient of the movie can be required pay the studio $2 to obtain the right to render the movie via corresponding usage rights and/or conditions. Such a render right can be configured to specify an unlimited number of views, over an unlimited period of time, and the like. As an incentive for customers of the studio to redistribute the movie, via appropriate usage rights and/or conditions, the studio can pay a customer a $1 payment for each copy that such a person transfers and for which the studio is paid the $2 fee. Advantageously, the exemplary distribution scenarios can be configured to include an owner-to-consumer model that can evolve into a peer-to-peer model, and the like.

In an exemplary embodiment, according to a second exemplary distribution model, and via appropriate usage rights and/or conditions, a government can enact a law that provides a consumer with the right to make up to two copies of an item, such as a movie file, video file, music file, and the like, that the consumer buys in digital form, because that is considered fair use of the item. With appropriate usage rights and/or conditions, the government can make it illegal to sell a movie, unless the movie is accompanied by technology that permits the movie to be copied up to two times. In addition, with appropriate usage rights and/or conditions, the government can allow an owner of a movie, such as the studio, the right to use technology to prevent more than two copies from being made.

In an exemplary embodiment, a year later, and via appropriate usage rights and/or conditions, the government can decide that two copies is not fair enough and enact a law that provides consumers with the right to make up to three copies. The law can provide that the three-copy right law is retroactive for all movies previously sold under the two-copy right law, and which, advantageously, can be implemented with the exemplary embodiments. The exemplary embodiments, thus, illustrate use of Digital Rights Management in connection with fair use legislation. In further exemplary embodiments, however, any other suitable law or regulation or no law at all, for example, just a preference of the studio as to how many copies the studio wishes to allow, can be implemented. Because future viewing of the movie can be important to the studio and the recipient of the movie, in an exemplary embodiment, a stakeholder, advantageously, can be designated to ensure appropriate future use of an item.

In an exemplary embodiment, according to a third exemplary distribution model, and via appropriate usage rights and/or conditions, an enterprise can be configured to grant scientists of the enterprise the right to render, for example, by viewing or printing, and the like, digital documents in a central repository, such as technical resource library of the enterprise, and the like. In an exemplary embodiment, such usage rights and/or conditions can be used to specify that the scientists can be given the right, for example, to download one copy from the central repository to a personal computer, while not being permitted others actions to be taken, such as to transfer the downloaded document, and the like. Advantageously, a year later, the enterprise can make a business decision that allowing such printing was not a good idea, and can specify via modified usage rights and/or conditions that such printing is no longer allowed, with such a rule being applicable to documents previously downloaded to the personal computer of the scientist.

A common theme in the exemplary distribution models is dynamic change. For example, in each of the exemplary distribution models someone or some party can be allowed to change their mind. Advantageously, the exemplary systems and methods of the exemplary embodiments can be employed to implement such decisions and changes.

In an exemplary embodiment, digital tickets also can be used to implement the exemplary distribution models. For example, in the third distribution model, the corresponding usage right can be used to specify a digital ticket, wherein access to a document can be made subject to a special ticket agent punching the digital ticket. In an exemplary embodiment, the digital ticket must be presented and punched for each access. Advantageously, if the enterprise later wishes to prevent printing, when the special ticket agent is requested by a scientist to punch a digital ticket, the special ticket agent can be configured to refuse the request. In an exemplary embodiment, this could be the end of the story, but in a further exemplary embodiment, the special ticket agent can be configured to provide the scientist with a means, such as a link, and the like, to acquire a new license, wherein the new license need not include the print right.

In an exemplary embodiment, a rights expression in the form of a master license, for example, can include master usage rights and can be stored in one or more repositories, and can be employed to effectuate a solution to the exemplary distribution models. The master license can include usage rights pertaining to an item, such as a digital work or other item, for example, the movie of the first and second exemplary distribution models, the technical documents of third exemplary distribution model, and the like. A user, customer, consumer, distributor, and the like, of an item can have a reference or pointer that can be associated with the master license.

In an exemplary embodiment, many persons can hold a pointer or reference associated with a common master license. In further exemplary embodiments, however, a single person can hold such a reference or pointer, for example, to implement the first exemplary use case of control by a parent of access to content by a child. In an exemplary embodiment, there can be more than one copy of a master license, for example, residing on servers located on different Local Area Networks (LANs) or devices, such as servers located in various geographies. In an exemplary embodiment, the multiple licenses can be similar or different. For example, it can be desired that a master license applies to the whole world, except for France, and that a variant of such as master license applies to France. In an exemplary embodiment, an appropriate reference or pointer for clients or persons to be associated with the France variant of the master license can be provided.

In an exemplary embodiment, a master license can include all the usage rights and conditions pertaining to an item, wherein, advantageously, a user, such as the possessor of a movie or the scientist of the exemplary embodiments, need only possess a reference or pointer to such a master license. Advantageously, such exemplary embodiments can be useful in resource-constrained environments, because a reference or pointer can consume less space than the information expressed in the master license. In a further exemplary embodiment, the master license can specify less than all usage rights and conditions. For example, some rights and conditions can be specified in separate usage rights including, for example, usage rights specific to each instance of an item, such as the movie or technical document of the exemplary distribution models.

In an exemplary embodiment, the reference or pointer can employ any suitable mode of communications, such as a hyperlink, an offline mode of communication, such as coupling two hardware devices or communication within a single device. For example, a repository including a master license associated with a movie can be on a same computer hard drive as the repository in which the movie is stored. There can be included a pointer or reference establishing a correspondence between usage rights specified in the master license and the movie, even though the usage rights and the movie are on the same device.

In an exemplary embodiment, the master license can specify the usage rights and conditions that are to be associated with an item, wherein a reference or pointer can point to the master license. In an exemplary embodiment, when a possessor of an item, such as a digital work or other item, for example, the possessor of the movie in the first and second exemplary distribution models, desires to access the item, such as to render the item, copy the item or move the item to another repository, the master license can be accessed. The purpose of the access can be to determine that the right to perform the proposed transaction, such as to render the item or copy the item, can be associated with the item and to check and fulfill any suitable conditions, such as to payment of a fee, and the like.

In an exemplary embodiment, such a check can be performed in each instance of attempted use, for example, to implement dynamic changes. For example, in the first exemplary distribution model, after one year, the owner of a copy of the movie would find that the right to view the movie has been upgraded to an unlimited right. Accordingly, it can be desirable that such a check with the master license be performed on each instance of attempted use, because that best implements the intent of dynamically implementing changes. In further exemplary embodiments, however, such a check can be performed at various times, frequencies, and the like.

In an exemplary embodiment, the movie studio of the first exemplary distribution model can employ mechanisms to provide notifications of changes in the corresponding usage rights. For example, such notification mechanisms can include sending an e-mail or directing persons, devices or systems logging into to the content distributions system, such as an Internet site, and the like, to the changed master license.

In an exemplary embodiment, every time a user wishes to render or take an action, such as copy or move, with respect to an item, the master license can be checked for a current state of the usage rights therein, for example, by interpreting, and the like, the master license. In an exemplary embodiment, if the master license can be determined to have changed, the master license can be interpreted differently than when the master license was last referenced. Accordingly, an action that was permitted yesterday may not be permitted today or a requested action denied yesterday may be permitted today. In an exemplary embodiment, the master license can be changed at any suitable time.

In an exemplary embodiment, a master license can be held by an issuer thereof or by some authority other than the issuer. For example, a studio owning a movie can employ an agent who can administer the master license for the studio. In an exemplary embodiment, the studio can maintain legal control of the master license, even thought the agent can hold or maintain physical control of the master license. In an exemplary embodiment, the studio or an agent thereof can change the master license as necessary or when required to do so by some other entity, such as a government, and the like, as in the second exemplary use case. In a further exemplary embodiment, however, a master license also can be held outside of the control of the issuer of the master license by a stakeholder, for example, under the control of a government authority or entity, such as the censors office of a government, a consumer organization, an industry association, a regulatory or self regulatory organization, a good business organization, such as a Better Business Bureau, and the like.

In a further exemplary embodiment, the master license can initially be held be one party, for example, the studio, and later by another party, for example, one or more stakeholders. Such change in holding of the master license can occur, for example, as specified in usage rights and/or conditions.

In an exemplary embodiment, a digital ticket that points to a reference or pointer that in turn points to a license, including a master license, can be employed. For example, a consumer can hold a digital ticket issued by a rights holder or other stakeholder, such as issued by a content owner as a rights holder or a government as a stakeholder, wherein the digital ticket includes a pointer to a reference pointer. In an exemplary embodiment, the reference pointer can be hosted, controlled, and the like, by the rights holder, which can include the item or content owner or another stakeholder. In an exemplary embodiment, any suitable pointer can initially be held or be controlled by one party and later by another party, for example, one or more stakeholders. In an exemplary embodiment, such a change in control of a pointer can occur, for example, as specified in usage rights and/or conditions.

In an exemplary embodiment, such a reference pointer can point to the actual usage right, advantageously, providing flexibility in the implementation of changing usage rights. For example, a change can be implemented by changing the actual usage right being pointed to or can be implemented by having the reference pointer change the place, for example, the usage right, to which the pointer is pointing. Advantageously, the change of such a pointer can occur at the reference pointer, obviating the need to change the pointer associated with the digital ticket.

In a further exemplary embodiment, however, a digital ticket need not be employed. For example, a pointer can be associated with an item, such as digital work or other item, and included as part of a license including the usage rights associated with the item. As with the exemplary digital ticket embodiment, such a pointer can point to a reference pointer, which in turn points to the actual license, for example, including a master license. Thus, in an exemplary embodiment, a user, consumer, distributor, and the like, of an item, can hold a usage right, which is or can include a pointer to a reference pointer. The reference pointer can be hosted, controlled, and the like, by a rights holder, which can include a content owner or another stakeholder.

Advantageously, according to the exemplary embodiments, a reference pointer can be configured to point to an actual usage right, thereby providing flexibility for implementing changes in usage rights. For example, a change can be implemented by merely changing the actual usage right being pointed to or can be implemented by having the reference pointer change the place, for example, the usage right, to which the reference pointer is pointing. Because the change of the pointer to the usage right occurs at the reference pointer, advantageously, a pointer associated with a digital ticket or a license or a usage right need not be changed.

In an exemplary embodiment, the person issuing a digital ticket, a license, a usage right, and the like, need not be the same person hosting or controlling the reference pointer. For example, the issuer can be the owner of an item, such digital content, a digital work or other item, and the reference pointer can be hosted or controlled by another stakeholder, such as a parent, a government authority or an authority within an enterprise. For example, in the second exemplary distribution model, if the government, as a stakeholder, controlled such a reference pointer, the government can implement a technology action to change the right of the consumers to make three instead of two copies of digital movies, advantageously, avoiding a need to implement an enforcement action to require the studio to change the corresponding licenses.

In an exemplary embodiment, a condition for allowing access to or use of a digital work or other item may be that the repository which is requesting access or which is proposed to receive or store or in any way be involved with the item have certain attributes or otherwise be configured in certain ways or not have certain attributes or configurations. For example, the repository can be required to possess minimal security attributes. If the repository is part of a personal document assistant (PDA) device, the repository can require that the PDA have specified or minimal security attributes and that the PDA be configured to permit the PDA to support the required conditions for access.

In an exemplary embodiment, a repository, including a device, such as a PDA, personal computer, and the like, can be reconfigured before such device can be involved with a digital work or other item. For example, such reconfiguration can involve the installation of new software at the repository or system or devices that control the repository, can involve changing parameters or other settings of existing software, can take the form of a software plug in, and the like.

In an exemplary embodiment, a condition for access, possession or the involvement with a digital work or other item of any suitable kind of repository or device can be that the repository or device permits itself to be reconfigured. For example, such reconfiguration can include that the repository or device allowing itself to be accessed, for example, by a central control repository, for changing default settings, installing new software, modifying existing software, inserting a plug in, disabling certain software or features, and the like, for example, in a way that such changes cannot be negated or at least not easily negated.

In an exemplary embodiment, if a repository or other device will not allow itself to be accessed or configured, then such a device need not be allowed to handle the digital work or other item. In further exemplary embodiments, such a device might be denied the right to handle certain types of items or not be allowed to perform functions otherwise permitted. In further exemplary embodiments, if upon accessing the repository or device, it is determined that such a device cannot be reconfigured in a way that meets the requirement of a condition, for example, such as when a repository, even after being reconfigured does not possess a minimum level of security, then the right to access or otherwise handle the item can be denied.

In further exemplary embodiments, the purpose of access to the repository or device can be to ascertain whether or not such as device meets one or more conditions. For example, if it is determined that such as device does meet such conditions, then reconfiguration need not be necessary or if it is determined that such a device does meet such conditions in part, then limited reconfiguration could be necessary.

In an exemplary embodiment, the condition that a repository or device be reconfigurable or reconfigured, for example, can apply to any suitable type of repository or device and to any suitable function that such a device might perform. For example, a condition could apply to any suitable repository or device which is to store a digital work or other item or which is to render the item or which is to transmit the item across a communications medium or which is a communications medium.

In an exemplary embodiment, Digital Rights Management systems, where access to digital resources can be controlled by a rights expression, can be employed to implement the exemplary embodiments. Typically, in such systems, rights expressions specifying usage rights can be created and associated with an item at one repository and another repository can then request access to the item in a client-server relationship. In further exemplary embodiment, however, both the client and the server repositories can create usage rights and associate such usage rights to an item.

The exemplary embodiments further include recognition that there is a need make it possible for the rights of other persons, such as consumers, as recipients and holders of digital works or other items, to be protected. For example, when a person obtains a digital work or other item and certain rights in the item, such as the right to copy the item, print the item, play the item, transfer the item to another device, and the like, the person expects that technology should not prevent the ability to utilize such rights. In an exemplary embodiment, for example, a consumer can acquire a digital work or other item together with the right to play the item an unlimited number of times on the condition the item can be played on an authorized device.

Accordingly, each time playing of the item is requested on a device, an exemplary system can be configured to perform a check to determine if the requested device is authorized to play the item. If, however, the party or entity operating the exemplary system has gone out of business, fails or neglects to perform such a check, or for any other suitable reason such a check cannot be performed, the consumer can be deprived of the right to play the item, even though the device of the consumer is an authorized device. In a further exemplarily embodiment, a consumer can acquire the right to obtain an Internet based service on the condition that the consumer makes a one time payment of $100 plus a payment of an additional $1 per use of the service. However, if the consumer is unable to access a system to tender the $1 to the provider of the service, for example, due to failure to perform or neglect or any other suitable reason, although the consumer is willing to pay, the consumer can deprived of the right to access the service, and if not merely transient, the consumer can be permanently deprived of the benefit of the initial payment of $100.

Thus, in an exemplary embodiment, for the best interests of providers of services, digital works and other items and of recipient customers of such providers, a stakeholder can be designated to perform obligations, needed tasks, and the like, to ensure that a recipient of an item can exercise rights associated with the item or service. Such a designation can be made in a suitable rights expression. In a further exemplary embodiment, a stakeholder can be designated to be operative, for example, upon certain conditions being met, such as a provider ceasing to do business, ceasing to comply with obligations, becoming unwilling or unable to perform or to perform in an agreed or appropriate manner or in a manner prescribed by law, and the like.

In an exemplary embodiment, such a stakeholder can be designated by a recipient or a provider or some other party or entity, and can include an association of providers or owners of digital works or services, an association of consumers or other recipients, a governmental entity, a regulatory or self regulatory association, a association, such as the Better Business Bureau, someone designated by any of the foregoing parties or any other suitable party or entity, and the like. In an exemplary embodiment, the designation of such a stakeholder can be by agreement between a provider and a recipient or can be an arrangement required by law or governmental regulation or self regulation, such as part of rule or a trade association practice.

Figure 5:
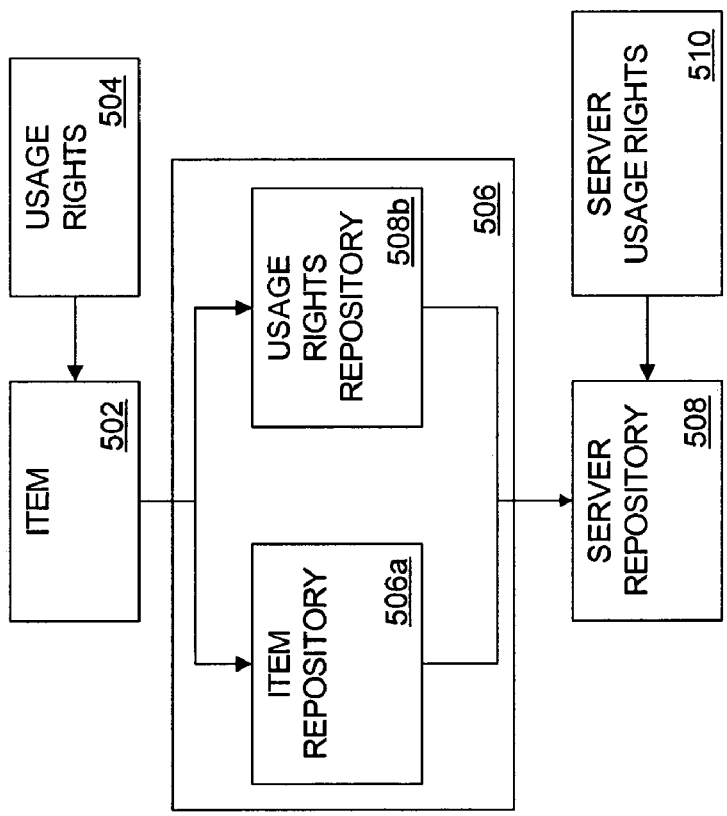
FIG. 5 illustrates an exemplary Digital Rights Management system in which a client and server repository can create and associate usage rights.

FIG. 5 illustrates an exemplary Digital Rights Management system 500 in which a client and server repository can create and associate usage rights. In FIG. 5, a digital work or other item 502, for example, in the form of digital content, such as a movie, song, and the like, can be employed, but the exemplary embodiments can be applied to any suitable type of item. A creator can create the item 502 and specify, via a rights expression, usage rights 504 for association with the item 502. In an exemplary embodiment, the usage rights 504 and the associated item 502 can be deposited in respective client repositories 506b and 506a. In a further exemplary embodiment, the usage rights 504 and the associated item 502 can be deposited in a same client repository 506, such as a common repository.

In an exemplary embodiment, the repositories 506b and 506a can be the same or different physical devices. The repository 506 can initiate a session with a server repository 508. The repository 506 or repository 506a if the usage rights 504 and the item 502 are not in a common repository can upload the item 502 along with the associated usage rights 504 to the server repository 508. In an exemplary embodiment, the item 502 can be uploaded or otherwise transmitted before, after or at the same time as the usage rights 504. For example, the item 502 can be uploaded after it is determined that the server repository 508 accepts access thereto. The server repository 508 can check to see if the usage rights 504 specify that the server repository 508 can access the item 502. If the usage rights 504 do not permit the server repository 508 to access the item 502, the server repository 508 can refuse access or terminate the session. If, however, the server repository 508 can have access to the item 502, the server repository 508 can perform authorized actions requested by the client repository 506 in accordance with server usage rights 510.

In an exemplary embodiment, if the usage rights 504 do not permit the server repository 508 to access the item 502, the server repository 508 can initiate a session with the repository 506 requesting access and specifying the server usage rights 510 that the server repository 506 requests. In a further exemplary embodiment, the repository 506 can initiate such a session. If the client repository 506 agrees to such access, then access can be granted.

In a exemplary embodiment, the determination as to whether there is agreement on access can be on the basis of the rights and conditions specified by the server repository 508 and not prohibited by the repository 506, plus the rights and conditions specified by the repository 506 and not prohibited by the server repository 508, combined to form the rights and conditions of an agreement. In further exemplary embodiments, however, other rules can be employed. One or more of the client repository 506 and the server repository 508 can perform the function of determining if there is an agreement or both repositories can do so and compare results. In an exemplary embodiment, the client 506 or server 508 repository can initiate a request and, thus, be a requesting repository. In an exemplary embodiment, a particular usage right, request or repository need not specify the rights and conditions.

In an exemplary embodiment, after performing the requested action, the server repository 508 can provide feedback to the repository 506 based on the execution of the requested action. In an exemplary embodiment, such feedback can include the result of a requested action or an acknowledgement of receipt of the request.

In an exemplary embodiment, the rights and conditions for comparison can be generated in any suitable manner. For example, the usage rights associated with digital works or other items and one or more repositories can be employed. In a further exemplary embodiment, however, usage rights need not be employed. In an exemplary embodiment, usage rights associated with an item can be compared with rights and conditions specified in a request from a requesting repository.

In an exemplary embodiment, a client repository, in a client-server model, can be configured to create and associate usage rights to items, such as digital works. By contrast, typical client side repositories simply consume content distributed by a server repository and typically are not involved in the creating of usage rights. By providing the client repository with the ability of creating of usage rights, advantageously, the exemplary use cases and distribution models can be implemented. For example, if a stakeholder controls the server repository 508 and/or the server usage rights 510, such a stakeholder can control what is done with the item 502.

Although the exemplary system 500 of FIG. 5 is described in terms of the client device repository 506 and the server device repository 508, in a further exemplary embodiment, the roles of the repositories can be reversed and either repository can operate in both a client and/or server mode. Thus, the storage of usage rights or items or digital works, the session initiation, the uploading and checking of the usage rights and the other functions, for example, can be performed by any suitable repository including another or any suitable number of other repositories.

In an exemplary embodiment, the server repository 508 can assign or pass along the server usage rights 510 to particular items 502, such as digital works or other items. In an exemplary embodiment, the server repository 508 functions can include functions for associating usage rights with the item 502. Thus, once associated, the item 502 can have one or more usage rights associated therewith, such as the usage rights assigned by the repository 508 and the usage rights, if any, such as the usage rights 504 associated with the item 502 prior to the encounter of the item 502 with the repository. Such an assignment of the usage rights can be done by any suitable method. In an exemplary embodiment, the usage rights associated with a repository then can be bound to an item, just as with usage rights previously associated with such an item. Advantageously, if a stakeholder controls the server repository 508 and/or the server usage rights 510, such a stakeholder can control what is done with the item 502.

In an exemplary embodiment, multiple repositories each can be used to assign usage rights to a particular item or just one repository can assign usage rights to an item on multiple occasions. The assigning repositories can be controlled by one or more entities or stakeholders. The usage rights can be cumulative. For example, in the case of a digital work in the form of a movie file, music file, and the like, initially a studio can create a usage right, for example, that permits viewing of the movie file five times within a thirty day period. A customer then can obtain the movie file with the associated usage right. Twenty-nine days later, the studio can decide to offer the customer a new deal and permit the customer unlimited viewing of the movie file for one year.

Accordingly, a transaction using any suitable methods, such as a transaction through an Internet site, and the like, can be performed between the studio and the customer and the movie possessed by the customer can have two usage rights associated therewith and the customer can exercise either one of the usage rights. In an exemplary embodiment, the first usage right can effectively be a subset of the second usage right, so effectively the second usage right can define the rights that the customer has with respect to the movie file.

In further exemplary embodiments, however, plural usage rights need not be subsets of each other. For example, the first usage right the customer obtained can be for five views within an unlimited period of time. If in the first twenty-nine days the customer uses two of those five views, the customer then can start using the right for the unlimited views for the next year, and, when that right has lapsed, the customer still can have three views left on the first usage right.

In an exemplary embodiment, the studio can specify that as a condition of the customer receiving the second usage right, the customer must give up the first usage right. In a further exemplary embodiment, the first usage right or an intervening usage right can be used to specify that no other usage rights can be associated with an item or that no more usage rights can be so assigned unless certain conditions are met.

Figure 6:
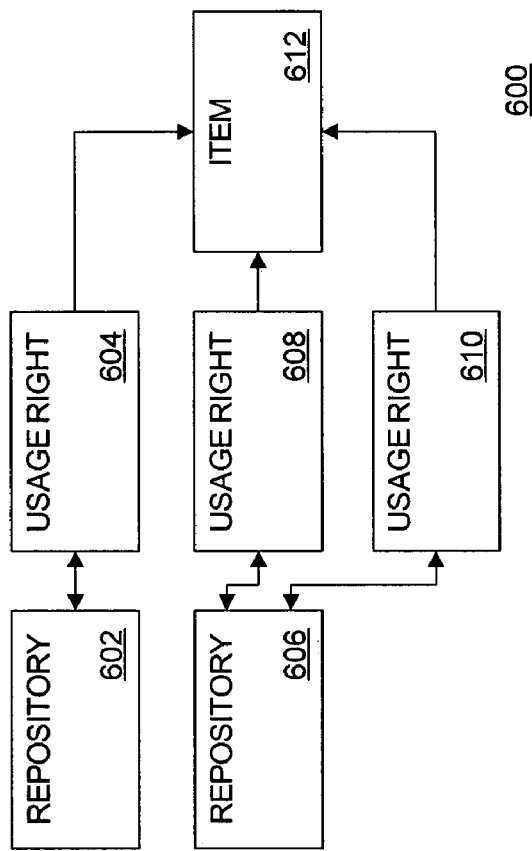
FIG. 6 illustrates an exemplary Digital Rights Management system in which plural repositories associate plural usage rights with an item.

FIG. 6 illustrates an exemplary Digital Rights Management system 600 in which plural repositories associate plural usage rights with an item. In FIG. 6, a repository 602 creates usage right 604 and associates the usage right 604 with an item 602, such a digital work or other item. A repository 606 then can create two usage rights 608 and 610 and associate the usage rights 608 and 610 with the item 612. The usage right 608 and the usage right 610 can be generated at the same time or at different times. In an exemplary embodiment, one of the usage rights 608 or 610 can be a subset of the other the usage rights 608 or 610 or the usage rights 608 and 610 each can include usage right information that is different from the other or from the usage right 604.

In an exemplary embodiment relating to the access of the item 612 in the form of a movie file, music file, and the like, the repository 606 can be controlled by the movie studio and the usage right 608 can permit the movie file 612, to be viewed five times within thirty days. The usage right 610 can be subsequently issued by the studio permitting unlimited viewing for a year. In an exemplary embodiment, the studio can create a business arrangement with a distributor giving the distributor, for example, via the exemplary meta-rights, the right to distribute the movies of the studio, including the right to provide usage rights to possessors of the movie file 612. In an exemplary embodiment, the distributor can maintain control of the repository 602.

After more than a year after the customer obtained the usage right 604 and the customer has consumed all rights under usage right 608, the customer learns that the distributor is offering to provide usage rights permitting the movie file 612 to be viewed an unlimited number of times on the condition of payment of $2. The customer then can initiate a transaction with the repository 602, pay the $2 fee and obtain the usage rights 604, which are associated with the movie file 612. Thus, the movie file 612 can have the usage rights 604, 608, and 610 associated therewith, wherein rights given by two of the usage rights have expired. In a further exemplary embodiment, however, zero or more of the usage rights 604, 608, and 610 can be active at the same time.

In an exemplary embodiment, a user, such as a customer, can be permitted to exercise whichever of plural usage rights the user possesses and that the user chooses to exercise. Advantageously, such a liberal approach can be particularly suited for business-to-consumer situations. For example, a consumer having two item tickets permitting rental of a car at two prices can choose the lowest price or the least restrictive item ticket. In an exemplary embodiment, an item ticket can include a mechanism by which a license can be associated with a non-digital item, for example, a tangible item, such as goods or services.

In an exemplary embodiment, a customer who possesses a copy of a song file, a movie file, and the like, can choose the right to play the file for free instead of the right to play the file for a fee. In an exemplary embodiment, any suitable systems and methods can be employed to automatically select the best usage right or the user can manually, for example, through human intervention, and the like, select the desired right or the user can specify rules or preferences to enable the system to automatically make decisions for the rights selection based on such rules or preferences. In a further exemplary embodiment, a restrictive system can be provided that can typically be employed in business, government or other enterprise environments. In an exemplary embodiment, use, access, and the like, of such a system can be permitted based on the most restrictive usage right.

In an exemplary embodiment, a permutation of the liberal and the restrictive systems can include a system where access can be based on the most restrictive right, unless certain conditions are met. In a further exemplary embodiment, a system can be provided where access is based on the most liberal right, unless certain conditions are not met. In an exemplary embodiment, such a condition can include the presentment or presence or the lack thereof of a digital ticket. In an exemplary embodiment, such conditions can be dynamic conditions tracked by state variables, and the like.

In an exemplary embodiment, the restrictive system can include a system where plural usage rights are subsets of each other and only the lowest set usage right can be exercised. The system enforcing rights management can make the choices about which usage right applies, thus, reversing the situation where the customer decides. In an exemplary embodiment, such a choice can involve human intervention, rules or a combination thereof, wherein usage rights associated with a repository according to the exemplary embodiments can be employed. The exemplary embodiments, for example, described with respect to FIGS. 5 and 6, advantageously, can be employed to provide stakeholders with a way to assign usage rights and thus influence, control or otherwise affect use, access, and the like, with respect to an item.

In the exemplary embodiments, usage rights can be associated with a repository. For example, the usage rights 504 can be assigned to the item 502, such as a digital work or other item, and the server usage rights 510 can be assigned to the server repository 508. In an exemplary embodiment, the usage rights 510 associated with the repository 508 can then be bound to or associated with the item 502. However, such association with the item 502 can be optional.

In an exemplary embodiment, the repository 508 can have one or more usage rights 510 associated therewith. Advantageously, the usage rights 510 can be used inform the repository of what usage rights, for example, including rights and/or conditions, can be associated with the item 502 and such usage rights need not be the same as the usage rights 510 associated with the repository 508.

Advantageously, the server usage rights 510 associated with the repository 508 can be used to enable the server repository 508 to know what to do when the server repository 508 encounters the item 502. In an exemplary embodiment, the server usage rights 510 associated with the server repository 508 can be used tell the server repository 508 what the server repository 508 can and cannot do. In an exemplary embodiment, such usage rights need not become permanently associated with the item 502.

In an exemplary embodiment, the conjunction of the usage rights 504 associated with the item 502 and the usage rights 510 associated with the repository 508 can be transitory, for example, existing long enough to enable an analysis of the various types of usage rights so that a decision can be made about what function to perform. The usage rights 510 associated with the repository 508 can be used to send the item 502 or information about the item 502 or the usage rights 504 associated with the item 502 to another location, such as a network, node, router, other repository, and the like, where a decision can be made or where the item 502 can be re-routed.

In a further exemplary embodiment, the item 502 need not be sent to such a location, but rather reference can be made to the location for a determination, in which case information about the item 502 or the associated usage rights 504 thereof can be sent. Similarly, the usage rights associated with the item 503 can be used to send the item 502 or such other information to another such location. In a further exemplary embodiment, usage rights can be used to specify that the item 502 is not to be sent to a location or reference made to such location or can go no further than a specified location.

In an exemplary embodiment, the usage rights 510 associated with the repository 508 can be used to inform the repository 508 that the repository 508 can render any suitable item 502, such as a digital work other item presented to the repository 508. In a further exemplary embodiment, the usage rights associated 510 with the repository 508 can be used to specify that the repository 508 can perform any suitable action requested of the repository 508, for example, except rendering. In a further exemplary embodiment, the usage rights 510 can be used to specify that the repository 508 can do any suitable action requested of the repository 508, including rendering, except that the repository 508 is restricted from rendering certain types of files, such as Joint Photographic Experts Group (JPEG) files, and the like.

Thus, according to the exemplary embodiments, the usage rights 510 can be configured to be permissive, for example, allowing everything or almost everything or can be restrictive, for example, allowing rendering of only JPEG files. The salient point is that the usage rights 510 can pertain to the repository 508, while other usage rights, such as the usage rights 504, can pertain to the item 502. Thus, the combination of the usage rights 504, if any, pertaining to the item 502, and the usage rights 510, if any, pertaining to the repository 508, can be used to determine what is permitted. The exemplary embodiments thus include the exemplary systems and methods described herein, wherein repositories can associate, pass on, and the like, usage rights to an item.

In an exemplary embodiment, the actions of the repository can be applied to particular digital works or items or to groups or classes of such digital works or items. In an exemplary embodiment, usage rights can be used to specify that a repository can perform an operation requested, for example, based on certain conditions being met. In an exemplary embodiment, such conditions can be dynamic and can be based on state variables, and the like. For example, a repository can be permitted to perform an operation with respect to an item, if a digital ticket is present corresponding to such an item. In an exemplary embodiment, the repository can be informed by the usage rights associated therewith to perform an action, for example, with respect to an item which bears a certain watermark or is signed in a certain way or otherwise is identifiable in some way. Such identification can be based on factors, such as what the item is, such a video file, music file, and the like, where the item is from, such as from a trusted source or any other suitable factor.

In an exemplary embodiment, association of usage rights to a repository can be used to determine the actions that can be performed with respect to an item. In an exemplary embodiment, any suitable item can be presented to a repository and the repository can determine if it can perform the requested action with respect to that item.

Thus, according to an exemplary embodiment, the thing that is being managed and controlled is the repository. The repository usage rights can be controlling over usage rights associated with an item. For example, if the usage right associated with an item specifies an action that is not permitted, while the usage right associated with a repository provides that such an action is permitted, then the result can be that the repository does perform such an action. Thus, according to an exemplary embodiment, supremacy of the repository usage rights can be a default mode. In further exemplary embodiments, however, the repository usage rights can yield to the item usage rights or the repository usage rights can yield to the item usage rights subject to certain conditions specified in usage rights or on certain occasions specified in usage rights.

In a further exemplary embodiment, the thing that is being managed and controlled is an item. In an exemplary embodiment, the usage right associated with such an item can specify that an operation can be performed, for example, by a certain repository or repositories. In an exemplary embodiment, the usage right can be used to grant plural rights and specify that some subset of such rights can be performed by certain repositories or that all rights must be performed by certain specified repositories. This concept can be thought of as conditions on the rights associated with the item.

In an exemplary embodiment, the usage right associated with an item need not grant any particular rights or specify any particular conditions, but rather can function to point or refer the item to a repository. In an exemplary embodiment, the usage rights of the repository can define and determine what actions are permitted with respect to such an item. Thus, the usage rights associated with an item can be used to present or point the item to a specified repository or repositories. In a further exemplary embodiment, there can be provided one or more of such pointers. In an exemplary embodiment, an item or information about the item can go to any of the suitable locations allowed by such pointers or can be used to attempt to locate a place that will permit the action requested.

By associating usage rights with repositories, the third exemplary distribution model, wherein the movie studio can be allowed to change the prices and number of views of a movie, advantageously, can be implemented. For example, when the user obtains a copy of the movie, the usage rights associated with the movie can include view rights. Such view rights also can be specified to be exercised a defined number of times, within a defined period, and the like, for example, by accessing a specified repository, and the like. Thus, when a customer presents the usage rights associated with the movie or the movie itself to the authorized repository for rendering, the user can find that the view rights have been upgraded to unlimited view rights. Advantageously, with the exemplary embodiment, the movie studio can change usage rights without having to retrieve copies of the movie, without having to change usage rights already associated with the movies or without having to take any other suitable actions.

In an exemplary embodiment, a repository need not be a single set of functional specifications, and need not be or reside in a single device or software program. Thus, a repository can include a virtual repository, for example, including plural computers, printers, storage devices, faxes, processors, and the like. Such a virtual repository can be thought of as turning multiple devices or functionalities into a single virtual device or functionality. For example, a home network can be configured as a single repository, can employ a distributed computing capability and can include plural repositories connected within a trust zone. Thus, in the exemplary embodiments, a repository with usage rights can be a repository, which can include a virtual repository. In an exemplary embodiment, when such a virtual repository has usage rights associated therewith, other repositories within the group including the virtual repository can have respective usage rights or derive such respective usage rights from another repository, such as another repository within the group, a central node of the virtual repository or a central control repository.

In an exemplary embodiment, a central control repository can be used in conjunction with various other repositories, item types, actions, and the like. In an exemplary embodiment, usage rights associated with an item can point or refer to such a repository and can constitute or include a pointer. In an exemplary embodiment, the central control repository can be connected through a communications network, such as the communications network 170, to other repositories or devices capable of performing specific functions, such printers, routers, computers, music players, e-mail servers, copying machines, storage repositories, video players, DVD media players, and the like. In an exemplary embodiment, the central control repository can be employed as a virtual repository.

Figure 7:
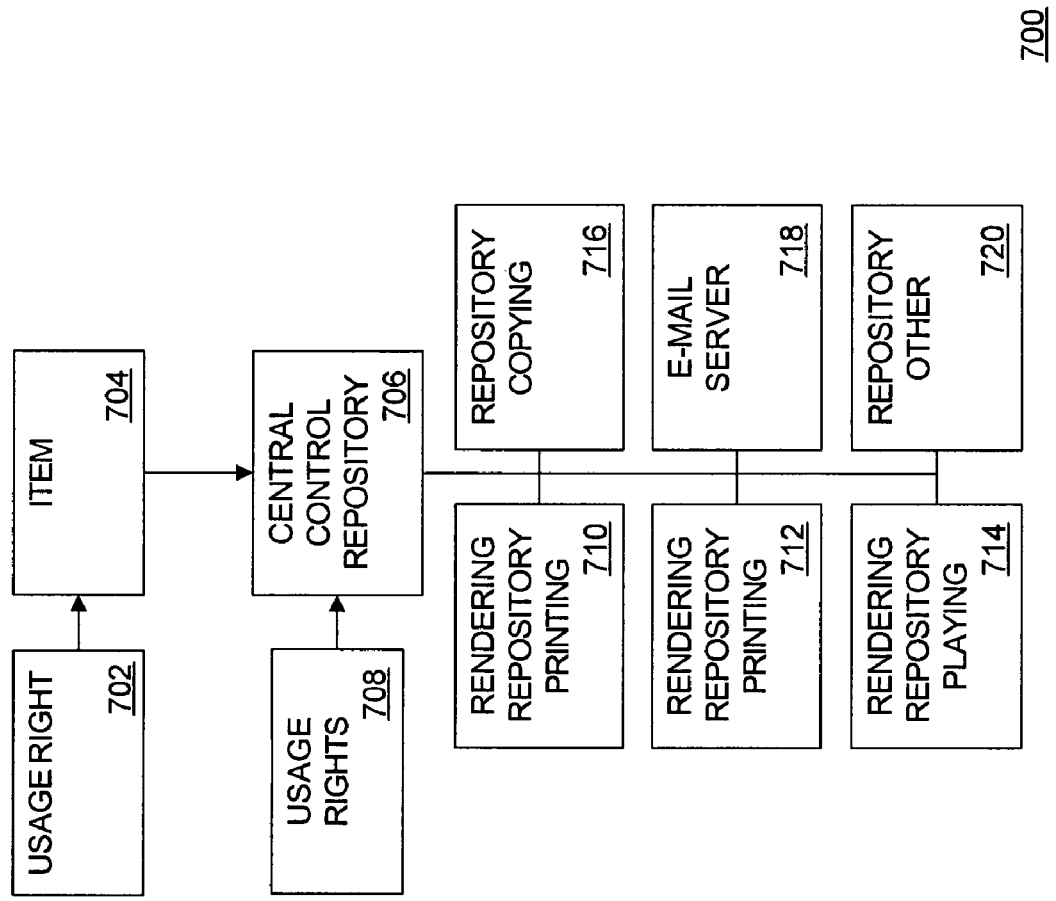
FIG. 7 illustrates an exemplary Digital Rights Management system in which a central control repository with usage rights associated therewith controls functions to be performed with respect to an item.

FIG. 7 illustrates an exemplary Digital Rights Management system 700 in which a central control repository with usage rights associated therewith controls functions to be performed with respect to an item. In FIG. 7, a usage right 702 associated with an item 704, such as a digital work or other item, can be used to point to a central control repository 706. In an exemplary embodiment, the usage right 702 associated with the item 704 can refer to the central control repository 706 as the place that specifies what usage rights pertain to the item 704. In a further exemplary embodiment, the usage right 702 can be used to define usage rights pertaining to the item 704, but further specify that such rights can be exercised only through the central control repository 706. The reference to the central control repository 706 can be thought of as a condition on the right to exercise rights specified in the usage rights 702.

In an exemplary embodiment, the central control repository 706 can have usage rights 708 associated therewith that control the actions, functions, and the like, the repository 706 is permitted to perform. In an exemplary embodiment, the usage rights 708 can be of any suitable type, for example, including usage rights general in nature or specific in nature or there between. For example, a general usage right 708 can include disallowing printing of the item 704, such as a document, and the like, even if the usage rights 702 associated with the item 704 permit printing or not allowing the routing of the item 704, such as an e-mail, and the like, to an e-mail server 718, if the item 704 is larger than one megabyte, even if usage rights associated with the item 704 permit e-mailing thereof.

In an exemplary embodiment, a specific usage right 708 can include permitting usage rights 702 of the item 704, such as a movie file, music file, and the like, to be upgraded to permit viewing of the item 704, even if the right to view usage right 702 associated with the item 704 has expired because the time allowed for viewing has expired.

In an exemplary embodiment, the central control repository 706 can be configured to analyze the usage rights 708 and the usage rights 702 of the item 704, for example, to determine what functions are permitted, what action to take, and the like. In an exemplary embodiment, if a request to perform a function or action is not permitted, such a request can be denied. If, however, the requested function or action is permitted or if some of plural requested functions or actions are permitted, then the central control repository 706 can route the request to repository or other device authorized to perform the requested function or action. In a further exemplary embodiment, the central control repository 706 can be authorized and capable of performing a given function, wherein the routing step need not be employed.

Thus, according to an exemplary embodiment, if a print function is requested, the central control repository 706 can route the request to a printer 710 or 712. Advantageously, the request can be routed to any suitable printer requested. However, if either the usage right 702 or 708 specify printing on a designated printer or printers, for example, such as the printer 710, then the request can be routed to the authorized printer or printers.

In a further exemplary embodiment, if both printed copy and a digital copy are requested, the request can be routed to the printer 710 and a repository 716 capable of performing the function of making a digital copy. In an exemplary embodiment, an attempt to exercise an unauthorized right can result in a consequence, such as the item or a usage right or both being impounded or held for machine or human intervention or a report being made concerning the attempt or other consequence. Thus, a usage right can be used to specify that a condition of exercise of the right is that an unauthorized action is not attempted and, optionally, what consequence follows from the unauthorized attempt.

In an exemplary embodiment, one or more of the repositories 710-720 can have usage rights (not shown) associated therewith. In an exemplary embodiment, there can be as many layers as a system designer desires to implement. For example, the e-mail server 718 can have associated therewith usage rights that are specific to the e-mail server 718 and which define what the e-mail server 718 can and cannot do.

In an exemplary embodiment, for example, the usage rights associated with the e-mail server 718 can cause the e-mail server 718 to not process the item 704, even though the central control repository 706 and the usage rights 702 associated with and the item 704 do not prohibit such processing. For example, the repository performing copy functions 716 via suitable usage rights associated therewith can be configured to refuse to make a copy of the item 704 or impose a condition on making such a copy, for example, such as payment of a $1 fee, notwithstanding a determination by the central control repository 706 based on analyzing the usage rights 702 and 708 that a copy can be made. In further exemplary embodiments, one or more of the repositories 710-720 can be configured as a virtual repository.

In an exemplary embodiment, if usage rights associated with one repository, for example, the copier repository 716, and the usage rights associated with another repository, for example, usage rights 708 associated with central control repository 706, are in conflict or can result in conflicting transactions or do not deal consistently with the same transaction, for example, where the copy repository 716 disallows printing, but the central control repository usage rights 708 does not disallow printing, but also does not expressly allow printing, a decision resolving the primacy of the respective usage rights can be made, for example, based on one or more rules.

In an exemplary embodiment, a repository can perform a function, for example, if a repository or an item is configured in a particular way. For example, an artist may want to permit printing of black and white versions of the item 704, such as a digital work of the artist, for example, including art, but prohibit printing color versions. The usage rights 702 associated with the item 704 can provide that the item 704 can be printed only on a black and white printer. Accordingly, in an exemplary embodiment, a condition can be used to ensure, for example, that the printer 712 be configured in a certain way, such as being configured to only print the item 704 in a gray scale format. For example, such a condition can specify that there must be detected the presence of a black only print cartridge in the printer 712. In an exemplary embodiment, the cartridge can be identified in any suitable manner, for example, including the identification of the presence of a hardware or firmware element, such as via CRUM technology for identifying a print cartridge.

In an exemplary embodiment, such a condition can be used to specify that the item 704 can be printed, if a particular type of print cartridge, such as a print cartridge of a specific manufacturer, is present in the print repository 712. In an exemplary embodiment, the condition specifying the presence of the specific print cartridge can be associated via corresponding usage rights with one or more of the item 704, the printer repository 712 or the central control repository 706. In a further exemplary embodiment, the condition can be used specify that the printing is allowed only with authorization, such as by presenting a digital ticket, and the like. The exemplary embodiments, advantageously, can be applied to the configuration of any suitable repository or sub-repositories, such as a repository dependant in some way on another repository.

In an exemplary embodiment, the item 704 need not have usage rights associated therewith, wherein the analysis of usage rights by the central control repository 706 can be of the usage rights 708 associated therewith. In the exemplary embodiments, the central control repository 706 or one or more of the other repositories 710-720 can be configured to examine and analyze other attributes about the item 704, such as meta data, the type of file, the size of the file, the presence or absence of an appropriate digital ticket, watermark or security indicator, the absence of tampering or any other suitable characteristics. One or more of such characteristics can be used as part of the process to determine which of the repositories 706 and 710-720 can process the item 704. For example, if a determined characteristic of the item 704, such as a music file, movie file, and the like, is that the item 704 is over one megabyte in size, the determination can be to not e-mail the item 704, notwithstanding that e-mailing was requested by a user.

In an exemplary embodiment, when usage rights are associated with repositories, usage rights need not be associated with an item, such as a digital work or other item. For example, the item can have a pointer or reference to a place to go to find what can be done with the item. In an exemplary embodiment, such a place can be a repository, which can have usage rights associated therewith. In a further exemplary embodiment, the repository to which the item can be pointed can be an authorized place to go to have usage rights assigned to the item or a place to go to be re-routed to another repository.

Thus, according to the exemplary embodiments, the thing being bound or associated to an item, such as a digital work or other item, can be a way, such as by employing a pointer, to locate a repository authorized to determine what can be done with the item. Advantageously, the exemplary embodiments can be employed in resource-constrained environments, because a reference can consume less space than the information expressing the corresponding usage rights.

In an exemplary embodiment, a repository can be configured to analyze any suitable item presented to the repository and determine, based on usage rights associated with the repository, characteristics of the item, and the like, what functions can be performed with respect to the item. Thus, advantageously, an item need not have a pointer associated with the item to direct the item to a particular repository in order for a repository to analyze the item and perform functions or actions. Accordingly, with the exemplary embodiments, a repository can be configured perform an analysis and functions or actions on any suitable item presented to the repository or on any suitable item presented from an authorized source, for example, such as from the central control repository 706, or which is otherwise identified as being an item which the repository is authorized to analyze or process.

Advantageously, the processing of items not having usage rights associated therewith through repositories having usage rights associated therewith can be utilized in various types of business applications, but can be particularly useful within an enterprise or any other suitable kind of a closed environment. For example, an enterprise including a government department can include an internal network connecting to stationary or transportable client devices, such as laptop computers, PDAs, and the like. In an exemplary embodiment, usage rights can be associated with appropriate repositories, such as servers, and the like, for example, including the central control repository 706. Thus, any suitable item moving off of a client device can pass to or through a repository having usage rights associated therewith and which can examine the item and make determinations concerning the item. In an exemplary embodiment, such a determination can include assigning usage rights to the item, wherein such usage rights can include state information or conditions including dynamic conditions.

In an exemplary embodiment, a client device can be configured so as to not communicate external to the device, for example, external to the hard drive of the device, except through the network of the enterprise or through authorized repositories or devices. For example, in a situation where the stakeholder is a government, a law can be configured to require that all or certain items, such as digital traffic moving into and/or out of a country, government department or other environment go through one or more authorized repositories. Advantageously, the repositories can be configured to examine such items and analyze and process such items in accordance with usage rights associated with such repositories.

In a further exemplary embodiment, the repositories can be configured to examine any suitable characteristics of an item, such as a media type, content, security type, size, watermarking, origin, author, and the like. If the item also has usage rights associated therewith, such analysis can include comparing usage rights associated with the item to those associated with the repository. Accordingly, the exemplary embodiments can be configured for an entity, such as the government, and the like, which can decide that usage rights or certain usage rights associated with an item can or will be disregarded and items will be processed in accordance with usage rights associated with a repository, notwithstanding the usage rights associated with the item.

In an exemplary embodiment, if an item is encrypted or otherwise protected in some fashion, the exemplary systems can be programmed or configured to refuse to process such an item. Advantageously, items with usage rights not authorized by a stakeholder need not be processed, for example, need not leave or enter the country or other environment, unless such usage rights can be overridden.

The exemplary embodiments are applicable to entities other than governments, such as business or personal enterprises. For example, the stakeholder can be a parent controlling access to information entering or leaving the home, for example, utilizing a network, such as wireless network, a WiFi network, a home network, and the like, and a repository through which traffic into or out of the home can be processed. In an exemplary embodiment, such control and processing can be for any suitable reason, such as for audit or census or censorship or control or security reasons.

In an exemplary embodiment, a function performed by a repository with respect to usage rights can include applying usage rights to an item, such as a digital work or other item. Thus, according to the exemplary embodiments, any suitable items entering and/or leaving a country or other environment can have usage rights associated therewith by a repository, such as an authorized repository, with the result that the item then can be used inside or outside the country or other environment, in accordance with the usage rights associated therewith by the repository. In an exemplary embodiment, the enforcement of such usage rights can be performed, for example, as disclosed in the commonly-assigned U.S. Pat. No. 5,530,235, No. 5,629,980, No. 5,634,012, No. 5,638,443, No. 5,715,403, No. 6,233,684, and No. 6,236,971, incorporated by reference herein.

In a further exemplary embodiment, it is not necessary that a client device present an item, for example, to a network of an enterprise, and the like, for the item to be analyzed or operations performed with respect to the item, such as assignment of usage rights to the item. Thus, in an exemplary embodiment, repositories, such as authorized repositories, connected to a network or other environment of an enterprise or other stakeholder can be configured to access client or other devices and for items found residing therein, analyze the items, make decisions or take actions concerning such items.

In an exemplary embodiment, with respect to the first exemplary use case, wherein a child accesses a musical work and the parent is the additional stakeholder, a networked repository, such as the central control repository 706, can be configured access a client device, such as a personal computer of the child, locate and access the appropriate digital work or other item, such as the musical work, and change the usage rights associated with the item, such that the item can no longer be used, for example, played. Advantageously, with the exemplary embodiments, the decision of the parent that the musical work is not appropriate for listening by the child can be enforced.

Figure 8:
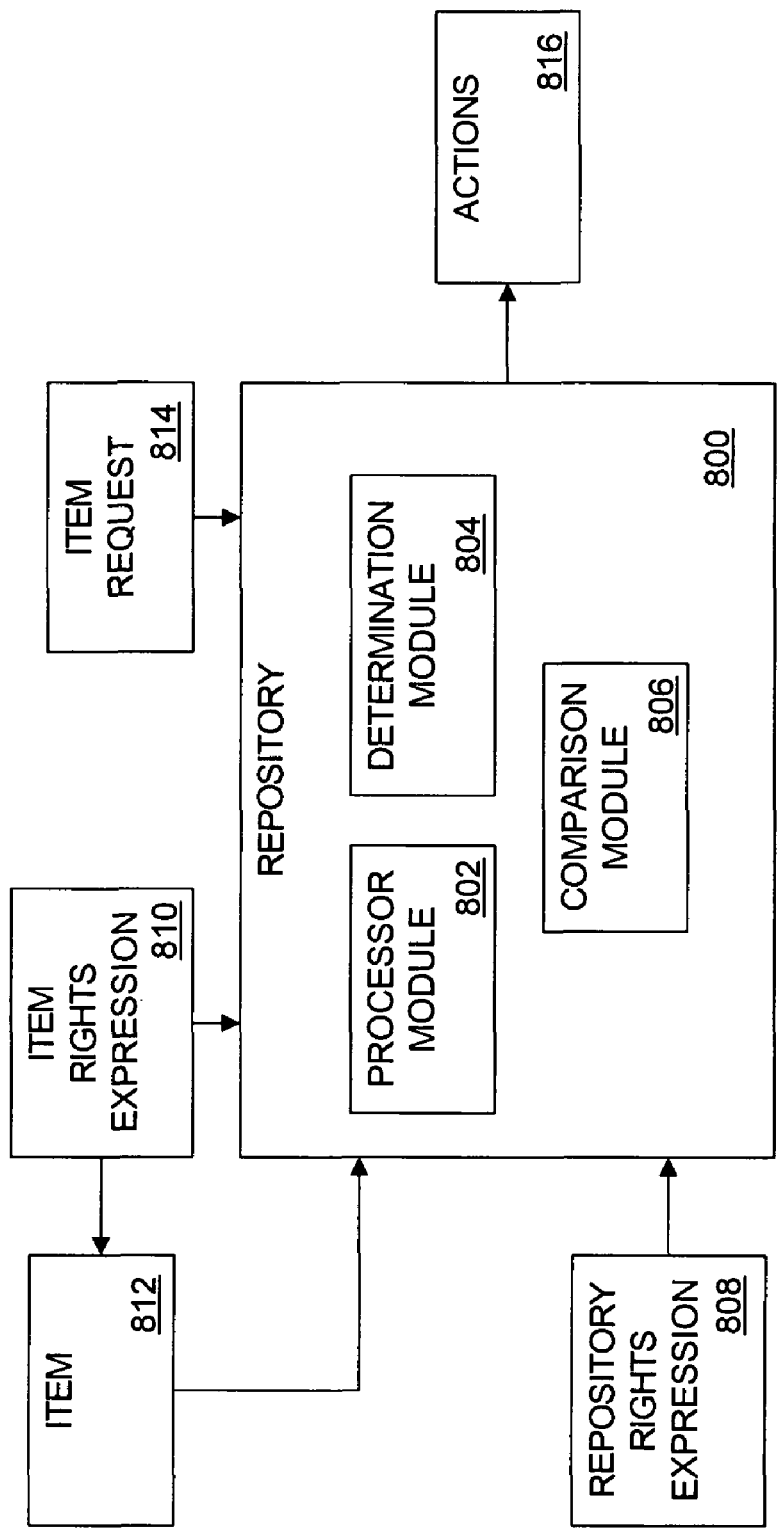
FIG. 8 illustrates an exemplary repository that can be employed in the exemplary embodiments of FIGS. 1-7.

FIG. 8 illustrates an exemplary repository 800 that can be employed in the exemplary embodiments of FIGS. 1-7. In FIG. 8, the exemplary repository 800 can include a processor module configured to process, interpret, and the like, a rights expression 808 in the form of a usage right associated with the repository 800, for example, specifying a manner of use of an item 812, a condition of use of the item 812, and the like, at the repository 800.

The exemplary repository 800, for example, also can include a determination module 804. The determination module 804 can be configured to determine, based on the rights expression 808 and/or one or more rules, what action or actions 816 the repository 800 can take when the repository 800 processes the item 812 or the repository 800 receives a request 814 for the item 812.

The exemplary repository 800, for example, also can include a comparison module 806. The comparison module 806 can be configured to compare a rights expression 810 associated with the item 812 and, for example, specifying a manner of use, a condition of use, and the like, of the item 812, with the rights expression 808 for the determination module 804 to determine the action or actions 816.

The exemplary embodiments can be applied to any suitable type of distribution system for digital works, goods, services or other things or items. In an exemplary embodiment, any suitable number of computers or other devices can be employed to practice the exemplary embodiments. In an exemplary embodiment, dynamic conditions, and the like, can be monitored and used to change usage rights assigned to content in any suitable manner. In an exemplary embodiment, usage rights can include any suitable privileges or restrictions on use and/or distribution of a digital work or other item or content thereof. In an exemplary embodiment, the dynamic conditions can be monitored, and the usage rights, for example, can be dynamically assigned or adjusted, constantly, periodically, only when a digital work or other item is to be distributed, and the like.

In an exemplary embodiment, the distribution, accounting, other functions, and the like, for example, of the distributor 120, the clearinghouse 150, and the like, can be accomplished by any suitable party on any suitable device. For example, a digital work or other item can be rendered on a device, such as an e-book reader, PDA, and the like, in response to entry of a code or insertion of a smartcard into a reader. Accounting can be accomplished when the item or accounting data is returned to a specific source. The division of tasks disclosed herein is of an exemplary nature.

In an exemplary embodiment, usage rights, accounting data, and the like, can be encapsulated with the digital work or other item or can be stored separately there from. Code for rendering, decrypting, or otherwise permitting or limiting use of the item can be stored on any suitable device or can be encapsulated with the item. In an exemplary embodiment, any suitable distribution arrangement can be employed, wherein such arrangements can include any suitable combination of devices, such as personal computers, servers, PDAs, and the like, communicating with one another in any suitable manner as is necessary to transfer the desired information.

Thus, the exemplary embodiments can be employed for online and offline modes of operation. For example, the rights expressions, including usage rights, and repositories can reside on the same device as the client device. Such a device can include a hard drive of a personal computer or some other handheld or transportable device. Advantageously, the exemplary embodiments enable a transaction to be consummated without having to establish a communication session with another device, through the Internet or otherwise.

In exemplary embodiment, a hard drive on a personal computer can include rights expression generating software, document preparation software, server software, and the like. Such software systems or components can provide the computing resources to create, package, prepare, and the like, an item, for example, content, such as a song, movie, and the like, create rights expressions, including usage rights and conditions, associated with the item and make decisions concerning usage of the item in accordance with such rights and conditions. In exemplary embodiment, such software systems can communicate with each other within the hard drive of a personal computer, and the like.

In an exemplary embodiment, to the extent communication outside the client device are employed to process a transaction for some reason, for example, to make a financial payment, there can be conducted an online session at a time other than the request for or use of the item. For example, the client device can communicate with the clearinghouse 150 and make an online payment. The payment can be recorded in the client device within, for example, a software component on the client device. Such a record can be recorded as a monetary amount, such as $100.00, or as units, such as ten viewings of a movie file or ten one-day rentals of a rental car from a particular company or in any other suitable manner.

In an exemplary embodiment, each use of an item can be recorded and deducted from the authorized amount or number of uses. In the case of a financial transaction, it is possible to make the transaction offline using a digital storage device, such as a smartcard, removable storage device, and the like. In an exemplary embodiment, information to be exchanged can be exchanged using a physical device in substitution for online communication. For example, a rights expression in the form of a license can be presented by inserting a card, such as a smartcard, and the like, having the license stored thereon into a personal computer.

In an exemplary embodiment, a customer holding a digital ticket associated with an item, such as access to service, and the like, can present the digital ticket and obtain the item, advantageously, without having to be online at the time the service is obtained. The service itself, which is obtained, can reside on a device controlled by the customer, such as a personal computer hard drive, and the like. In an exemplary embodiment, the service can include the execution of a computer program.

Figure 9:
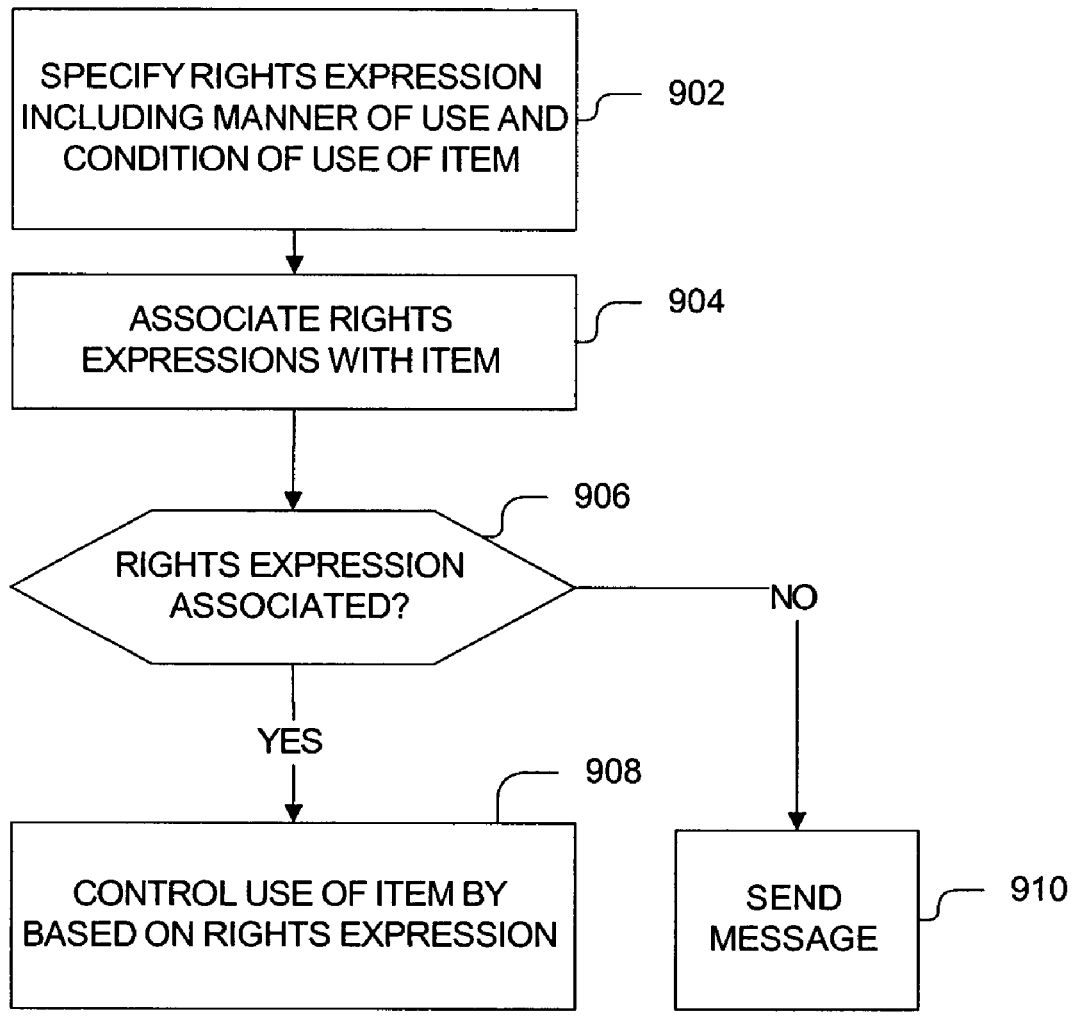
FIG. 9 is a flowchart of an exemplary process for controlling usage rights to digital works or other items by stakeholders thereof and that can be employed in the exemplary embodiments of FIGS. 1-8.

FIG. 9 is a flowchart of an exemplary process for controlling usage rights to digital works or other items by stakeholders thereof and that can be employed in the exemplary embodiments of FIGS. 1-8. In FIG. 9, at step 902, a provider of an item can specify in a rights expression a manner of use of the item by a recipient of the item and a condition for use of the item by the recipient. In an exemplary embodiment, the condition can be used to indicate that the use by the recipient of the item is subject to control, for example, by the provider of the item and/or a stakeholder with regards to the item, and the like. At step 904, the rights expression can be associated with the item. If the rights expression can be associated with the item, as determined at step 906, the use by the recipient of the item can be controlled, at step 908, based on the condition in the rights expression. Otherwise, at step 910, and appropriate message can be sent, for example, indicating that the rights expression was not associated with the item.

In an exemplary embodiment, the use by the recipient of the item is subject to such control by a provider and/or other stakeholder of the item, for example, as described with respect to the exemplary embodiments of FIGS. 1-8 relating to consumer protection, the use of one or more repositories, including a central control repository, digital tickets, master licenses, pointers, and the like.

In an exemplary embodiment, for example, directed to consumer protection, a stakeholder need not be a provider of a digital work or other item and can be given control with respect to enforcement of use of the item, for example, as specified in a suitable rights expression. In an exemplary embodiment, specifying a rights expression can include any suitable way of creating, indicting, and the like, a rights expression. In an exemplary embodiment, a recipient of an item can include a person, system, device, software or other entity entitled to use an item, which need not entail actually physically receiving a rights expression or an item, for example, as in the case of remote access to an item. In an exemplary embodiment, parameters of use of an item can be different from manners of use and need not be a specific type of use. For example, parameters of use can include using an item to make as many copies as a current law defines as fair use, wherein the corresponding manner if use can be copy and the corresponding conditions can be that a copy count can be no more than one, where a current law permits one copy as fair use.

The devices and subsystems of the exemplary embodiments described with respect to FIGS. 1-9 can communicate, for example, over the communications network 170, and can include any suitable servers, workstations, personal computers (PCs), laptop computers, PDAs, Internet appliances, set top boxes, modems, handheld devices, telephones, cellular telephones, wireless devices or other devices capable of performing the processes of the disclosed exemplary embodiments. The devices and subsystems, for example, can communicate with each other using any suitable protocol and can be implemented using a general-purpose computer system, and the like. One or more interface mechanisms can be employed, for example, including Internet access, telecommunications in any suitable form, such as voice, modem, and the like, wireless communications media, and the like. Accordingly, communications network 170 can include, for example, wireless communications networks, cellular communications networks, satellite communications networks, Public Switched Telephone Networks (PSTNs), Packet Data Networks (PDNs), the Internet, intranets, hybrid communications networks, combinations thereof, and the like. Accordingly, the communications network 170 can include one or more networks.

It is to be understood that the exemplary embodiments described with respect to FIGS. 1-9, are for exemplary purposes, as many variations of the specific hardware used to implement the disclosed exemplary embodiments are possible. For example, the functionality of the devices and the subsystems of the exemplary systems can be implemented via one or more programmed computer systems or devices. To implement, such variations as well as other variations, a single computer system can be programmed to perform the functions of one or more of the devices and subsystems of the exemplary systems. On the other hand, two or more programmed computer systems or devices can be substituted for one or more of the devices and subsystems of the exemplary systems. Accordingly, principles and advantages of distributed processing, such as redundancy, replication, and the like, also can be implemented, as desired, for example, to increase the robustness and performance of the exemplary embodiments described with respect to FIGS. 1-9.

The exemplary systems described with respect to FIGS. 1-9 can be used to store information relating to various processes described herein. This information can be stored in one or more memories, such as a hard disk, floppy disk, optical disk, magneto-optical disk, RAM, ROM, and the like, of the devices and sub-systems of the exemplary systems described with respect to FIGS. 1-9. One or more databases of the devices and subsystems can store the information used to implement the exemplary embodiments. The databases can be organized using data structures, such as records, tables, arrays, fields, graphs, trees, lists, and the like, included in one or more memories, such as the memories listed above.

All or a portion of the exemplary embodiments described with respect to FIGS. 1-9 can be conveniently implemented using one or more general-purpose computer systems, microprocessors, digital signal processors, micro-controllers, and the like, programmed according to the teachings of the disclosed exemplary embodiments. Appropriate software can be readily prepared by programmers of ordinary skill based on the teachings of the disclosed exemplary embodiments. In addition, the exemplary embodiments can be implemented by the preparation of application-specific integrated circuits or by interconnecting an appropriate network of component circuits.

Stored on any one or on a combination of computer readable media, the exemplary embodiments of the present invention can include software for controlling the devices and sub-systems of the exemplary systems described with respect to FIGS. 1-9, for driving a device or devices for implementing the invention, and for enabling the devices and sub-systems of the exemplary systems described with respect to FIGS. 1-9 to interact with a human user. Such software can include, but is not limited to, device drivers, firmware, operating systems, development tools, applications software, etc. Such computer readable media further can include the computer program product of an embodiment of the present invention for performing all or a portion (if processing is distributed) of the processing performed in implementing the invention. Computer code devices of the embodiments of the present invention can include any interpretable or executable code mechanism, including but not limited to scripts, interpretable programs, dynamic link libraries (DLLs), Java classes and applets, complete executable programs, Common Object Request Broker Architecture (CORBA) objects, etc. Moreover, parts of the processing of the embodiments of the present invention can be distributed for better performance, reliability, and/or cost.

The computer readable medium can include any suitable medium that participates in providing instructions to a processor for execution. Such a medium can take many forms, including, but not limited to, non-volatile media, volatile media, transmission media, and the like. Non-volatile media can include, for example, optical or magnetic disks, magneto-optical disks, and the like. Volatile media can include dynamic memory, and the like. Transmission media can include coaxial cables, copper wire and fiber optics, including the wires that make up one or buses of a computer. Transmission media also can take the form of acoustic, optical, or electromagnetic waves, such as those generated during radio frequency (RF) and infrared (IR) data communications.

As stated above, the exemplary embodiments described with respect to FIGS. 1-9 can include one or more computer readable medium or memory for holding instructions programmed according to the teachings of the invention and for including data structures, tables, records or other data described herein. Common forms of computer-readable media can include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media can be involved in providing instructions to a processor for execution. For example, the instructions for carrying out at least part of the exemplary embodiments of the present invention can initially be borne on a magnetic disk of a remote computer connected to the network 170. In such a scenario, the remote computer can load the instructions into main memory and send the instructions, for example, over a telephone line using a modem. A modem of a local computer system can receive the data on the telephone line and use an infrared transmitter to convert the data to an infrared signal and transmit the infrared signal to a portable computing device, such as a personal digital assistant (PDA), a laptop, an Internet appliance, and the like. An infrared detector on the portable computing device can receive the information and instructions borne by the infrared signal and place the data on a bus. The bus can convey the data to main memory, from which a processor retrieves and executes the instructions. The instructions received by the main memory can optionally be stored on storage device either before or after execution by a processor.

Advantageously, the exemplary embodiments can be employed in offline systems, online systems, and the like, and in applications, such as TV applications, computer applications, DVD applications, VCR applications, appliance applications, CD player applications, and the like. In addition, the signals employed to transmit the legality expression of the exemplary embodiments, can be configured to be transmitted within the visible spectrum of a human, within the audible spectrum of a human, not within the visible spectrum of a human, not within the audible spectrum of a human, combinations thereof, and the like.

Although the exemplary embodiments can be described in terms of applications in music, games, movies, coupons, legal arenas, and the like, the exemplary embodiments are applicable to any suitable application, such as digital and non-digital content, devices, software, services, goods, resources, and the like, and can be practiced with variations in technology, interface, language, grammar, content, rights, offerings, services, speed, size, limitations, devices, and the like.

While the present invention have been described in connection with a number of exemplary embodiments and implementations, the present invention is not so limited but rather covers various modifications and equivalent arrangements, which fall within the purview of the appended claims.

What is claimed is:

1. A computer-implemented method for controlling use of an item, said method comprising:
    specifying, by a provider of an item, a computer-readable rights expression, wherein said rights expression indicates a manner of use of said item by a recipient of said item and a condition for use of said item by said recipient, said condition indicating that said use of said item by said recipient is subject to an authorization by a stakeholder;
    associating said rights expression with said item;
    receiving a request, at a repository computing device, for use of said item from said recipient;
    granting by said stakeholder said authorization for use of said item by said recipient, in accordance with said condition; and
    controlling said repository computing device by said stakeholder to thereby control said use of said item by said recipient based on said rights expression and said authorization granted by said stakeholder, wherein said controlling step comprises:
        employing a master license that at least one of references said rights expression and is referenced by said item, said master license including a latest version of said rights expression;
        checking said master license for said latest version of said rights expression; and
        controlling said master license by said stakeholder to control said use of said item by said recipient.

2. The method of claim 1, further comprising:
    granting said use of said item by a first repository from a second repository; and
    controlling said second repository by said stakeholder to control said use of said item by said recipient.

3. The method of claim 1, further comprising:
    employing a digital ticket that references said rights expression;
    specifying in said rights expression that presentment of said digital ticket is required for granting said use of said item by said recipient; and
    controlling said digital ticket by said stakeholder to control said use of said item by said recipient.

4. The method of claim 1, further comprising:
    specifying by said stakeholder in a fights expression a condition for use of said item by said recipient; and
    associating said rights expression of said stakeholder with said item.

5. The method of claim 4, further comprising:
    indicating in said condition specified by said stakeholder that said use of said item by said recipient is subject to authorization by a stakeholder.

6. The method of claim 4, further comprising:
    specifying by said stakeholder in said fights expression that said condition for use of said item by said recipient is subject to control by another stakeholder.

7. The method of claim 1, further comprising:
    specifying by a plurality of stakeholders in respective fights expressions respective conditions for use of said item by said recipient; and
    associating said rights expressions of said stakeholders with said item.

8. The method of claim 7, further comprising:
    indicating in at least one of said respective conditions that said use of said item by said recipient is subject to authorization by one or more of said plurality of stakeholders.

9. The method of claim 1, further comprising:
    specifying by said provider in said rights expression a condition indicating that said use of said item by said recipient is subject to respective conditions of a plurality of stakeholders.

10. The method of claim 9, further comprising:
    specifying in said fights expression said conditions of said plurality of stakeholders indicating that said use of said item by said recipient is subject to authorization by one or more of said plurality of stakeholders.

11. The method of claim 1, wherein said master license includes at least one rights expression indicating a manner of use of said item in accordance with applicable legislation, law or regulation.

12. The method of claim 1, wherein said master license is under the control of a regulatory or governmental unit.

13. The method of claim 1, further comprising:
    accessing one or more pointers that references said master license to perform said checking step.

14. The method of claim 13, further comprising:
    changing said one or more of said pointers to reference another master license instead of said master license or in addition to said master license.

15. The method of claim 1, further comprising:
    accessing one or more pointers that reference one or more pointers to said master license to perform said checking step.

16. The method of claim 1, wherein said rights expression includes a prohibited manner of use by said recipient of said item.

17. The method of claim 1, wherein said manner of use comprises a usage right.

18. The method of claim 1, wherein said use of said item includes access to said item.

19. The method of claim 1, wherein said recipient includes at least one of a user of said item, a distributor of said item and a consumer of said item.

20. The method of claim 1, wherein said item includes at least one of digital content, digital goods, digital services, non-digital content, non-digital goods and non-digital services.

21. The method of claim 1, wherein said stakeholder is a third party.

22. A computer-implemented system for controlling use of an item, said system comprising:

means for specifying, by a provider of an item, a computer-readable rights expression, wherein said rights expression indicates a manner of use of said item by a recipient of said item and a condition for use of said item by said recipient, said condition indicating that said use of said item by said recipient is subject to an authorization by a stakeholder;

means for associating said rights expression with said item;

means for receiving a request, at a repository computing device, for use of said item from said recipient;

means for granting by said stakeholder said authorization for use of said item by said recipient, in accordance with said condition; and means for controlling said repository computing device by said stakeholder to thereby control said use of said item by said recipient based on said fights expression and an authorization granted by said stakeholder, wherein said means for controlling comprises:

means for employing a master license that at least one of references said rights expression and is referenced by said item, said master license including a latest version of said rights expression;

means for checking said master license for said latest version of said rights expression; and means for controlling said master license by said stakeholder to control said use of said item by said recipient.

23. The system of claim 22, further comprising:

means for granting said use of said item by a first repository from a second repository; and means for controlling said second repository by said stakeholder to control said use of said item by said recipient.

24. The system of claim 22, further comprising:

means for employing a digital ticket that references said rights expression;

means for specifying in said fights expression that presentment of said digital ticket is required for granting said use of said item by said recipient; and means for controlling said digital ticket by said stakeholder to control said use of said item by said recipient.

25. The system of claim 22, further comprising:

means for specifying by said stakeholder in a fights expression a condition for use of said item by said recipient; and means for associating said fights expression of said stakeholder with said item.

26. The system of claim 25, further comprising:

means for specifying by said stakeholder in said rights expression that said condition for use of said item by said recipient is subject to control by another stakeholder.

27. The system of claim 25, further comprising:

means for indicating in said condition specified by said stakeholder that said use of said item by said recipient is subject to authorization by a stakeholder.

28. The system of claim 22, further comprising:

means for specifying by a plurality of stakeholders in respective rights expressions respective conditions for use of said item by said recipient; and means for associating said rights expressions of said stakeholders with said item.

29. The system of claim 28, further comprising:

means for indicating in at least one of said respective conditions that said use of said item by said recipient is subject to authorization by one or more of said plurality of stakeholders.

30. The system of claim 22, further comprising:

means for specifying by said provider in said rights expression a condition indicating that said use of said item by said recipient is subject to respective conditions of a plurality of stakeholders.

31. The system of claim 30, further comprising:

means for specifying in said rights expression said respective conditions of said plurality of stakeholders indicating that said use of said item by said recipient is subject to authorization by one or more of said plurality of stakeholders.

32. The system of claim 22, wherein said master license includes at least one rights expression indicating a manner of use of said item in accordance with applicable legislation, law or regulation.

33. The system of claim 22, wherein said master license is under the control of a regulatory or governmental unit.

34. The system of claim 22, further comprising:

means for accessing one or more pointers that references said master license to perform said checking.

35. The system of claim 34, further comprising:

changing said one or more of said pointers to reference another master license instead of said master license or in addition to said master license.

36. The system of claim 22, further comprising:

means for accessing one or more pointers that reference one or more pointers to said master license to perform said checking.

37. The system of claim 22, wherein said rights expression includes a prohibited manner of use by said recipient of said item.

38. The system of claim 22, wherein said manner of use comprises a usage right.

39. The system of claim 22, wherein said use of said item includes access to said item.

40. The system of claim 22, wherein said recipient includes at least one of a user of said item, a distributor of said item and a consumer of said item.

41. The system of claim 22, wherein said item includes at least one of digital content, digital goods, digital services, non-digital content, non-digital goods and non-digital services.

42. The system of claim 22, wherein said stakeholder is a third party.

43. A computer-readable medium including one or more computer-readable instructions embedded therein for controlling use of an item, said computer-readable instructions comprising:

instructions for specifying, by a provider of an item, a computer-readable rights expression, wherein said rights expression indicates a manner of use of said item by a recipient of said item and a condition for use of said item by said recipient, said condition indicating that said use of said item by said recipient is subject to an authorization by a stakeholder;

instructions for associating said fights expression with said item;

instructions for receiving a request, at a repository computing device, for use of said item from said recipient;

instructions for granting by said stakeholder said authorization for use of said item by said recipient, in accordance with said condition; and instructions for controlling said repository computing device by said stakeholder to thereby control said use of said item by said recipient based on said fights expression and an authorization granted by said stakeholder, wherein said instructions for controlling comprise:

instructions for employing a master license that at least one of references said rights expression and is referenced by said item, said master license including a latest version of said fights expression;
instructions for checking said master license for said latest version of said fights expression; and
instructions for controlling said master license by said stakeholder to control said use of said item by said recipient.

44. The computer-readable medium of claim 43, further comprising:
instructions for granting said use of said item by a first repository from a second repository; and
instructions for controlling said second repository by said stakeholder to control said use of said item by said recipient.

45. The computer-readable medium of claim 43, further comprising:
instructions for employing a digital ticket that references said rights expression;
instructions for specifying in said rights expression that presentment of said digital ticket is required for granting said use of said item by said recipient; and
instructions for controlling said digital ticket by said stakeholder to control said use of said item by said recipient.

46. The computer-readable medium of claim 43, further comprising:
instructions for specifying by said stakeholder in a rights expression a condition for use of said item by said recipient; and
instructions for associating said rights expression of said stakeholder with said item.

47. The computer-readable medium of claim 46, further comprising:
instructions for indicating in said condition specified by said stakeholder that said use of said item by said recipient is subject to authorization by a stakeholder.

48. The computer-readable medium of claim 46, further comprising:
instructions for specifying by said stakeholder in said rights expression that said condition for use of said item by said recipient is subject to control by another stakeholder.

49. The computer-readable medium of claim 43, further comprising:
instructions for specifying by a plurality of stakeholders in respective rights expressions respective conditions for use of said item by said recipient; and
instructions for associating said rights expressions of said stakeholders with said item.

50. The computer-readable medium of claim 49, further comprising:
instructions for indicating in at least one of said respective conditions that said use of said item by said recipient is subject to authorization by one or more of said plurality of stakeholders.

51. The computer-readable medium of claim 43, further comprising:
instructions for specifying by said provider in said rights expression a condition indicating that said use of said item by said recipient is subject to respective conditions of a plurality of stakeholders.

52. The computer-readable medium of claim 51, further comprising:
instructions for specifying in said rights expression said respective conditions of said plurality of stakeholders indicating that said use of said item by said recipient is subject to authorization by one or more of said plurality of stakeholders.

53. The computer-readable medium of claim 43, wherein said master license includes at least one rights expression indicating a manner of use of said item in accordance with applicable legislation, law or regulation.

54. The computer-readable medium of claim 43, wherein said master license is under the control of a regulatory or governmental unit.

55. The computer-readable medium of claim 43, further comprising:
instructions for accessing one or more pointers that references said master license to perform said checking.

56. The computer-readable medium of claim 55, further comprising:
changing said one or more of said pointers to reference another master license instead of said master license or in addition to said master license.

57. The computer-readable medium of claim 43, further comprising:
instructions for accessing one or more pointers that reference one or more pointers to said master license to perform said checking.

58. The computer-readable medium of claim 43, wherein said rights expression includes a prohibited manner of use by said recipient of said item.

59. The computer-readable medium of claim 43, wherein said manner of use comprises a usage right.

60. The computer-readable medium of claim 43, wherein said use of said item includes access to said item.

61. The computer-readable medium of claim 43, wherein said recipient includes at least one of a user of said item, a distributor of said item and a consumer of said item.

62. The computer-readable medium of claim 43, wherein said item includes at least one of digital content, digital goods, digital services, non-digital content, non-digital goods and non-digital services.

63. The computer-readable medium of claim 43, wherein said stakeholder is a third party.

64. A computer-implemented method for controlling use of an item, said method comprising:
specifying, by a provider of an item, a computer-readable rights expression, wherein said rights expression indicates a manner of use of said item by a recipient of said item and a condition for use of said item by said recipient, said condition indicating that said use of said item by said recipient is subject to an authorization by a stakeholder;
associating said rights expression with said item;
receiving a request, at a repository computing device, for use of said item from said recipient;
granting by said stakeholder said authorization for use of said item by said recipient, in accordance with said condition; and
controlling said repository computing device by said stakeholder to thereby control said use of said item by said recipient based on said rights expression and said authorization granted by said stakeholder, wherein said controlling step comprises;
employing a central control repository that at least one of references said rights expression and is referenced by said item, said central control repository including a latest version of said rights expression;
checking said central control repository for said latest version of said rights expression; and controlling said central control repository by said stakeholder to control said use of said item by said recipient.

65. The method of claim 64, wherein said central control repository includes at least one rights expression indicating a manner of use of said item in accordance with applicable legislation, law or regulation.

66. The method of claim 64, wherein said central control repository is under the control of a regulatory or governmental unit.

67. A computer-implemented system for controlling use of an item, said system comprising:
  means for specifying, by a provider of an item, a computer-readable rights expression, wherein said rights expression indicates a manner of use of said item by a recipient of said item and a condition for use of said item by said recipient, said condition indicating that said use of said item by said recipient is subject to an authorization by a stakeholder;
  means for associating said rights expression with said item;
  means for receiving a request, at a repository computing device, for use of said item from said recipient;
  means for granting by said stakeholder said authorization for use of said item by said recipient, in accordance with said condition; and
  means for controlling said repository computing device by said stakeholder to thereby control said use of said item by said recipient based on said fights expression and an authorization granted by said stakeholder, wherein said means for controlling comprises:
    means for employing a central control repository that at least one of references said fights expression and is referenced by said item, said central control repository including a latest version of said fights expression;
    means for checking said central control repository for said latest version of said fights expression; and
    means for controlling said central control repository by said stakeholder to control said use of said item by said recipient.

68. The system of claim 67, wherein said central control repository includes at least one rights expression indicating a manner of use of said item in accordance with applicable legislation, law or regulation.

69. The system of claim 67, wherein said central control repository is under the control of a regulatory or governmental unit.

70. A computer-readable medium including one or more computer-readable instructions embedded therein for controlling use of an item, said computer-readable instructions comprising:
  instructions for specifying, by a provider of an item, a computer-readable rights expression, wherein said rights expression indicates a manner of use of said item by a recipient of said item and a condition for use of said item by said recipient, said condition indicating that said use of said item by said recipient is subject to an authorization by a stakeholder;
  instructions for associating said fights expression with said item;
  instructions for receiving a request, at a repository computing device, for use of said item from said recipient;
  instructions for granting by said stakeholder said authorization for use of said item by said recipient, in accordance with said condition; and
  instructions for controlling said repository computing device by said stakeholder to thereby control said use of said item by said recipient based on said fights expression and an authorization granted by said stakeholder, wherein said instructions for controlling comprise:
    instructions for employing a central control repository that at least one of references said fights expression and is referenced by said item, said central control repository including a latest version of said fights expression;
    instructions for checking said central control repository for said latest version of said fights expression; and
    instructions for controlling said central control repository by said stakeholder to control said use of said item by said recipient.

71. The computer-readable medium of claim 70, wherein said central control repository includes at least one rights expression indicating a manner of use of said item in accordance with applicable legislation, law or regulation.

72. The computer-readable medium of claim 70, wherein said central control repository is under the control of a regulatory or governmental unit.

* * * * *